United States Patent
Ravichandran

(10) Patent No.: US 11,032,333 B2
(45) Date of Patent: Jun. 8, 2021

(54) SYSTEMS AND METHODS FOR PROVIDING ONE-WAY VIDEO CALLS

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 51 days.

(21) Appl. No.: 16/226,076

(22) Filed: Dec. 19, 2018

(65) Prior Publication Data
US 2020/0204599 A1   Jun. 25, 2020

(51) Int. Cl.
*H04L 29/06* (2006.01)
*G06F 3/0482* (2013.01)

(52) U.S. Cl.
CPC ...... *H04L 65/1086* (2013.01); *H04L 65/1006* (2013.01); *H04L 65/1016* (2013.01); *H04L 65/1096* (2013.01); *H04L 65/403* (2013.01); *G06F 3/0482* (2013.01)

(58) Field of Classification Search
CPC ............ H04L 65/1086; H04L 65/1006; H04L 65/1016; H04L 65/1096; H04L 65/403; G06F 3/0482
USPC ....................................................... 709/204
See application file for complete search history.

(56) References Cited

U.S. PATENT DOCUMENTS

| | | | |
|---|---|---|---|
| 2005/0180338 A1 | 8/2005 | Pirila et al. | |
| 2007/0120959 A1* | 5/2007 | Wu | G01R 31/3648 348/14.02 |
| 2012/0268553 A1* | 10/2012 | Talukder | H04L 65/1093 348/14.08 |
| 2014/0233560 A1* | 8/2014 | Wengrovitz | H04L 29/06027 370/352 |

(Continued)

FOREIGN PATENT DOCUMENTS

| | | |
|---|---|---|
| KR | 20030034717 A | 5/2003 |
| KR | 101909146 B1 | 10/2018 |

OTHER PUBLICATIONS

AT&T Customer Care, Make & receive an AT&T Video Call on your Samsung Galaxy S7, Apr. 18, 2016, YouTube, https://www.youtube.com/watch?v=g8XT3MDDlgl (Year: 2016).*

(Continued)

*Primary Examiner* — Zi Ye
(74) *Attorney, Agent, or Firm* — Lee & Hayes, P.C.

(57) ABSTRACT

Systems and methods for enabling one-way video calling are disclosed. The system can enable user equipment (UE) with varying capabilities to communicate in an asymmetrical manner. A UE receiving an incoming two-way video call can request that the call be "downgraded" to a one-way video-in call, a one-way video-out call, or even an audio-only call. The system can include a multi-way video graphical user interface (GUI) to enable the user to choose between accepting an incoming two-way video call or requesting a different type of call (e.g., a one-way video call or an audio-only call). The system can also include a call initiation GUI to enable users to select between two-way video, one-way video, or audio-only for outbound calls. The system can also include a call modification GUI to enable users to modify the parameters for an incoming call prior to initiating the call.

20 Claims, 12 Drawing Sheets

(56) References Cited

U.S. PATENT DOCUMENTS

2016/0021336 A1* 1/2016 Abbott ................ H04L 65/1059
  348/14.02
2018/0160074 A1 6/2018 Mercredi et al.

OTHER PUBLICATIONS

AT&T, One-touch video calling built into your smartphone, Sep. 6, 2018, www.att.com, https://web.archive.org/web/20180906120707/https://www.att.com/shop/wireless/features/video-calling.html (Year: 2018).*

Verizon Wireless, Place a Video Call—HD Voice, Sep. 2, 2016, www.verizonwireless.com, https://web.archive.org/web/20160902091055/http://www.verizonwireless.com/support/knowledge-base-91284/ (Year: 2016).*

AT&T, Make & Receive an AT&T Video Call, 2016, www.att.com, https://www.att.com/devicehowto/tutorial.html#!/stepbystep/id/stepbystep_KM1282660?make=Samsung&model=SamsungG930A (Year: 2016).*

Cisco, Cisco WebEx Meeting Center Getting Started, Oct. 24, 2014, Cisco WebEx, https://www.webex.com/content/dam/webex/eopi/Americas/USA/en_us/documents/pdf/MC/pdf-MC-Getting-Started-Win-GTG-EN.pdf (Year: 2014).*

The PCT Search Report and Written Opinoin dated May 18, 2020, PCT Application No. PCT/US2019/063941, 12 pages.

* cited by examiner

SYSTEMS AND METHODS FOR PROVIDING ONE-WAY VIDEO CALLS

BACKGROUND

Video calls are available on a number of networks and systems, including on some cellular networks. For business use, video calls can enable users to attend meetings virtually, see presentations, and talk "face-to-face" with colleagues. For personal use, video calls can enable distant family members to visit in a way that is not possible on voice-only calls. For a soldier on deployment, for example, this may be his or her only option to see family for months or years at a time.

One drawback to current video conferencing technologies, however, is that if one of the participants is unable to participate in a video call, an attempted video call is automatically "dropped" to an audio-only call. There may be situations, however, where it would be desirable to provide a one-way video call—i.e., a call where only the sender sends, and the recipient receives, video. The recipient may have a user equipment (UE), for example, that has a functioning screen, but a non-functioning (or non-existent) camera. The recipient may nonetheless wish to receive the video from the sender, yet send only audio in return.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
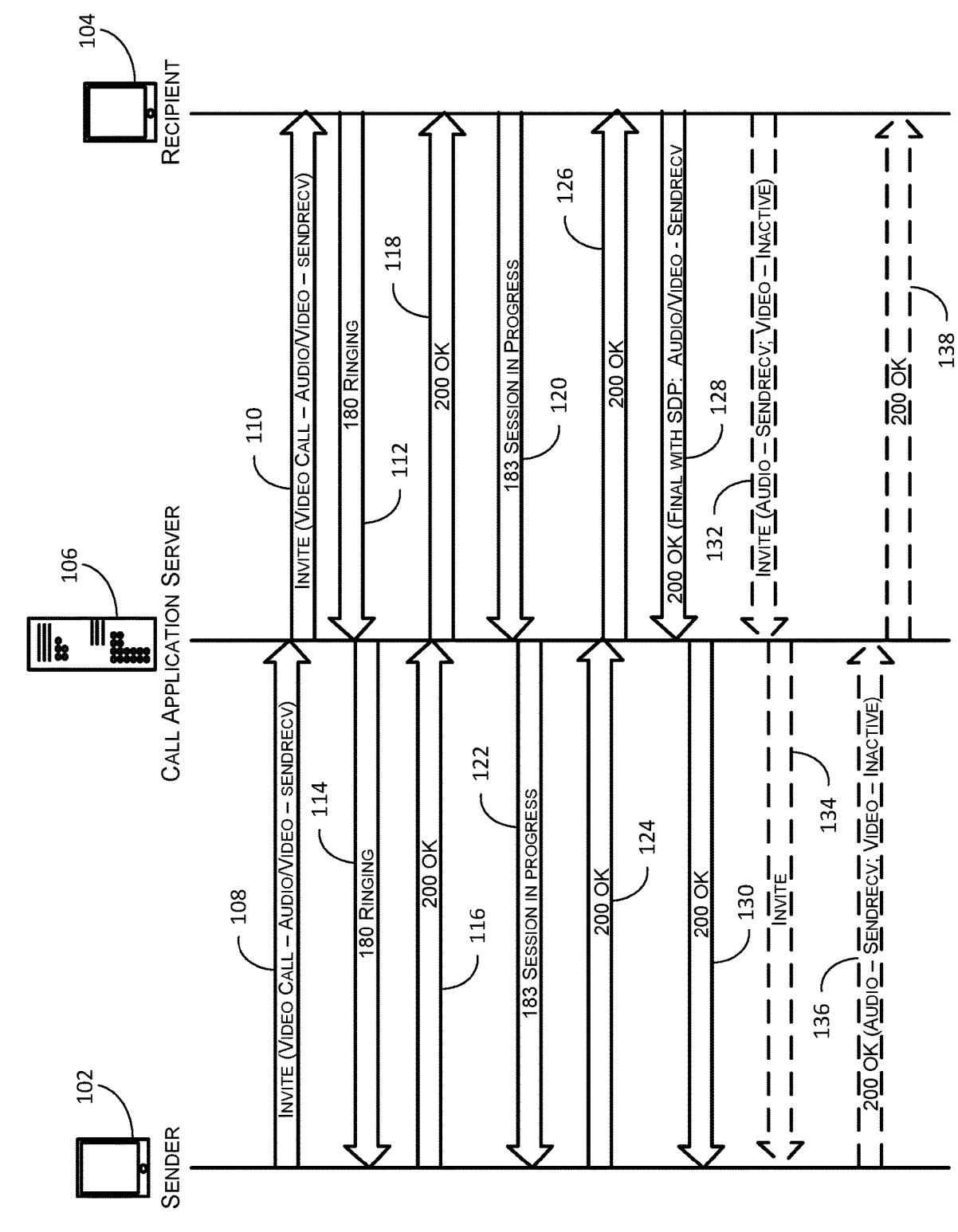
FIG. 1 depicts a conventional system for establishing two-way video calls.

Examples of the present disclosure can comprise systems and methods for sending and receiving one-way video calls. The system can enable a sender to initiate a one-way video call. The system can also enable a recipient to establish a one-way video call, rather than being forced to drop down to an audio-only call. The system can enable users to choose between a two-way video call, a one-way video call, or an audio-only call using an updated graphical user interface (GUI).

For clarity, the systems and methods provided herein are described in terms of session initiation protocol (SIP) messages. One of skill in the art will recognize, however, that the systems and methods described herein are equally applicable to other protocols such as, for example, hypertext transfer protocol (HTTP), message session relay protocol (MSRP), or other current or future messaging protocols. The system is also described below for use with current technology networks (e.g., 4G LTE networks, 5G networks, etc.). One of skill in the art will recognize, however, that similar solutions could be used for establishing one-way video calls on 5G, Internet of Things (IoT), machine-to-machine (M2M), and even future network technologies that have yet to be invented. Thus, the use of 2G, 3G, 4G LTE, and 5G in the examples below is simply a reflection of current technologies and is not meant to limit the application. Indeed, one of ordinary skill in the art will see that the system could also be used, with little or no modification, with online video conferencing and other technologies.

As mentioned above, video calls can enable users to have a "face-to-face" experience. This can be useful for both business and personal purposes. Video conferencing and video calls, for example, enable users to work remotely and to virtually attend meetings and seminars, among other things. Grandparents who live separately from their children and grandchildren, on the other hand, can use video calling features (e.g., Facetime®) to stay in touch in a way that audio-only calls cannot provide.

Standard SIP session based video calling, however, does not have a provision for one-way video calls. If a user attempts to place a call to a user that does not have video capabilities, for example, the recipient user equipment (UE) simply replies to the initial SIP request with a response to initiate an audio-only call. This may be because the recipient UE does not have a camera, for example, or does not have sufficient signal strength or signal quality for a video call, among other things. Indeed, using current technology, if a user accepts a video call, the only way to simulate a one-way video call is for the recipient to turn off their camera. This has the effect of providing a black screen to the sender, but this is not technically the same as a one-way video call. In other words, the two-way video channel for the call remains open, with the recipient camera merely sending a black "picture." Thus, while only the recipient sees a video image of the sender, the bandwidth required for two-way video is still being utilized.

There are several scenarios where one-way video calling could be useful. If the recipient UE has a functioning screen, but does not have a camera, for example, the recipient UE would normally automatically establish an audio-only call in response to a request to initiate a video call. Yet, the recipient may wish to receive, and the sender may wish to send, one-way video. Indeed, a user who is virtually attending a meeting or a seminar, especially a large one, may wish to see the presentation of the sender, for example, yet a return video feed may be unnecessary or undesirable (e.g., the user is still in pajamas!). Establishing a seminar or meeting with tens or hundreds of participants with a one-way video feed out (from the presenter) and audio-only in (from the participants), could also significantly reduce the bandwidth requirements for the meeting.

FIG. 1 depicts conventional call establishment between a user equipment (UE) of a sender 102 and the UE of a recipient 104 via a call applications server 106. The UEs 102, 104 can be any type of electronic device capable of various types of communications (e.g., audio, video, text messaging, etc.) including, but not limited to, cell phones, smart phones, tablet computers, and laptop computers. For ease of explanation, the message is shown going straight from the sender UE 102 to the call application server 106 to the recipient UE 104. One of skill in the art will recognize that, in reality, connections can involve several additional network entities such as, for example, a home subscriber service (HSS) and/or a proxy call session control function (P-CSCF) server, which are discussed below in more detail with reference to FIG. 10.

At 108, the sender UE 102 can send an "INVITE" to the recipient UE 104, via the call application server 106, to participate in a video call with the recipient UE 104. The invite can include, for example, the phone number or IP address of the sender (from), the phone number or IP address of the recipient (to), the conversation ID, contribution ID, user agent (UA), call ID, etc. The INVITE can also include a header indicating the desire to establish a video call. As such, the INVITE can include an audio send and receive ("SENDRECV") and a video send and receive ("SENDRECV"), indicating that the sender UE 102 wishes to establish a bidirectional audio channel and a bidirectional video channel. At 110, the INVITE can be sent from the call application server 106 to the recipient UE 104 for acceptance.

At 112, the recipient UE 104 sends a message indicating that it has received the INVITE and that the recipient UE 104 is ringing—e.g., a 180 RINGING SIP message. At 114, the call application server 106 can relay the 180 RINGING to the sender UE 102. At 116, the sender UE 102 can acknowledge the 180 RINGING with a 200 OK. This is simply an acknowledgement that the sender UE 102 has received the 180 RINGING and is standing by. At 118, the call application server 106 can relay the 200 OK to the recipient UE 104.

At 120, if the recipient UE 104 has video call capability, the recipient UE 104 can establish a new session and send another acknowledgement. In this case, the recipient UE 104 can send a 183 SESSION IN PROGRESS, establishing a session between the recipient UE 104 and the sender UE 102. At 122, the call application server 106 can relay the 183 SESSION IN PROGRESS to the recipient UE 104.

At 124, the sender UE 102 can acknowledge the 183 SESSION IN PROGRESS with another 200 OK. At 126, the call application server 106 can relay the 200 OK to the recipient UE 104. Finally, at 128, the recipient UE can send a final 200 OK that includes its willingness and ability to establish the video call. Thus, the recipient UE 104 can send a 200 OK message that includes an audio "SENDRECV" and a video "SENDRECV." This informs the sender UE 102 that the recipient UE 104 is establishing the session with audio and video in both directions—i.e., both UEs 102, 104 are sending and receiving both audio and video. At 130, the call application server 106 can relay the 200 OK to the sender UE 102 and the video call is established.

The only other alternative that is available using current technology is for the recipient UE 104 to establish a voice-only call. This may be necessary when, for example, the recipient UE 104 does not have a camera, has a low battery, or poor signal quality, among other things. This alternative configuration is shown in dashed lines in FIG. 1.

At 132, instead of sending the final 200 OK (at step 128), the recipient UE 104 essentially "renegotiates" the call. Thus, while the initial INVITE included a request for audio and video send and receive, at 132, the recipient UE responds with a new INVITE to establish an audio-only call. The INVITE includes the requested audio SENDRECV, but for video, the recipient UE 104 sends INACTIVE. This indicates to the sender UE 102 that the recipient UE 104 is willing and able to establish a bidirectional audio channel, but unwilling or unable to establish a bidirectional video channel. And since currently the only two choices are to (1) establish a two-way video call or (2) establish an audio-only call—i.e., one-way audio and/or video are not available— the call automatically drops down to an audio-only call.

At 134, the call application server 106 passes the message, with the new parameters, to the sender UE 102. At 136, the sender UE 102 replies with a 200 OK, but with the new configuration (audio—SENDRECV; video—INACTIVE). At 138, the call application server 106 relays the 200 OK to the recipient UE 104 and the audio-only call is established.

In many cases, however, it may be desirable for the recipient UE 104 to establish one-way communications for audio and/or video. The recipient UE 104 way wish to receive audio or video, for example, but not send audio or video, or vice-versa. If the recipient UE 104 does not have a camera (or it is broken), for example, the recipient may nonetheless wish to receive video from the sender UE 102. Using current technology, however, the recipient UE 104 would automatically establish an audio-only call, as shown in steps 132-138 of FIG. 1.

Figure 2:
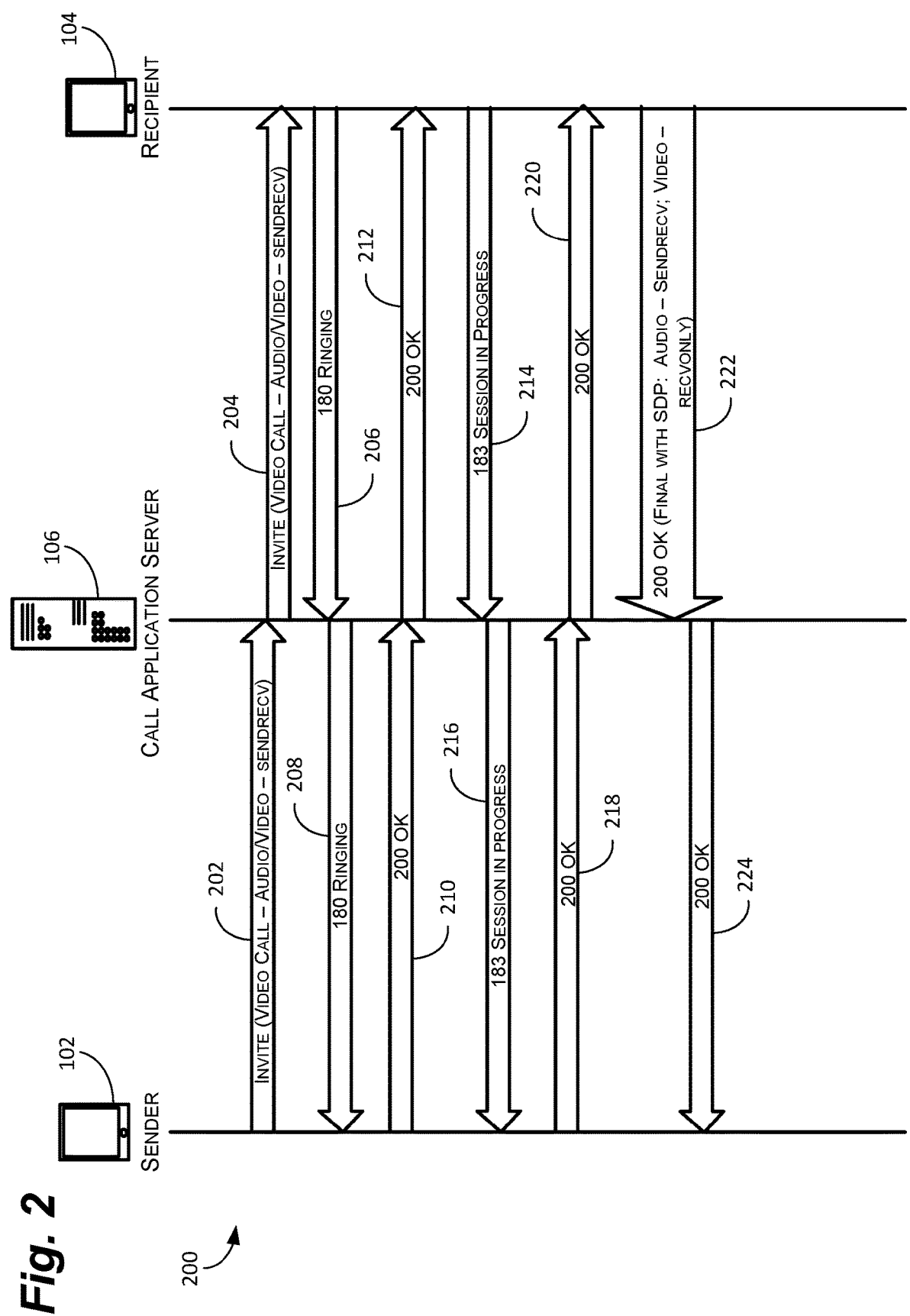
FIG. 2 is an example of a system for providing one-way video calls, in accordance with some examples of the present disclosure.

To this end, as shown in FIG. 2, examples of the present disclosure can include a system 200 for providing one-way audio and/or one-way video communications between two UEs. The system 200 can enable one UE to send video, and the other UE to receive the video, without requiring two-way video communications. Using a similar method, the UEs can also connect with audio only going one-way. As before, the method is described in terms of a sender UE 102, a recipient UE 104, and a call application server 106. Of course, in reality, other UEs and other network entities could also be included.

At 202, the sender UE 102 can send an INVITE to the recipient 104, via the call application server 106, in an attempt to initiate a two-way video call with the recipient UE 104. The invite can include, for example, the phone number or IP address of the sender (from), the phone number or IP address of the recipient (to), the conversation ID, contribution ID, user agent (UA), call ID, etc. The INVITE can also include a header indicating the desire to establish a video call. As shown, the INVITE can include a request for audio—SENDRECV and video—SENDRECV indicating that the sender UE 102 wishes to establish a bidirectional audio channel and a bidirectional video channel. At 204, the INVITE can be sent from the call application server 106 to the recipient UE 104 for acceptance.

At 206, the recipient UE 104 can send a message indicating that it has received the INVITE and that the recipient UE 104 is ringing—e.g., a 180 RINGING SIP message. At 208, the call application server 106 can relay the 180 RINGING to the sender UE 102. At 210, the sender UE 102 can acknowledge the 180 RINGING with a 200 OK. This is simply an acknowledgement that the sender UE 102 has received the 180 RINGING and is standing by. At 212, the call application server 106 can relay the 200 OK to the recipient UE 104.

At 214, the recipient UE 104 can establish a new communications session with the sender UE 102. To acknowledge this, the recipient UE 104 can send a 183 SESSION IN PROGRESS, which establishes a session (e.g., a real-time transport protocol, or RTP, session) between the recipient UE 104 and the sender UE 102. At 216, the call application server 106 can relay the 183 SESSION IN PROGRESS to the recipient UE 104. At 218, the sender UE 102 can acknowledge the 183 SESSION IN PROGRESS with another 200 OK. This is simply an acknowledgment that the sender UE 102 has received the 183 SESSION IN PROGRESS. At 220, the call application server 106 can relay the 200 OK to the recipient UE 104.

In this case, although the sender UE 102 has requested a two-way video call, the recipient UE 104 is unable or unwilling to establish two-way video communications. As a result, at 222, the recipient UE sends a 200 OK with modified parameters. The recipient UE 104 can send a 200 OK that establishes two-way audio—Audio—SENDRECV—but one-way video—Video—RECVONLY. Thus, in this example, the recipient UE 104 can send and receive audio, but only receive video. As mentioned above, this may be because the recipient UE 104 does not have a camera or simply because the recipient does not want to provide video (e.g., they are working from home). At 224, the call application server 106 can relay the updated 200 OK to the sender UE 102 and the session is established with two-way audio and one-way video.

Of course, the session can be established with many combinations of parameters. In other words, each UE 102, 104 can establish one-way or two-way audio and/or one-way or two-way video, as long as there is at least a one-way channel. If neither UE 102, 104 wants to send video (e.g., each sends a Video—RECVONLY), for example, then the call can automatically be dropped to an audio-only call. If both UEs 102, 104 send RECVONLY for both audio and video, then the call can fail. In other words, if neither UE 102, 104 is sending data, then no call can take place. Thus, while many combinations are possible, some are not complementary as shown in Table 1:

TABLE 1

| Sender UE 102 | Recipient UE 104 | Result |
| --- | --- | --- |
| Audio - SENDRECV<br>Video - SENDRECV | Audio - SENDRECV<br>Video - SENDRECV | Video Call |
| Audio - SENDRECV<br>Video - SENDRECV | Audio - SENDRECV<br>Video - INACTIVE | Audio-Only Call |
| Audio - SENDRECV<br>Video - SENDRECV | Audio - SENDRECV<br>Video - RECVONLY | Two-Way Audio<br>One-Way Video<br>(to Recipient) |
| Audio - SENDRECV<br>Video - SENDRECV | Audio - SENDRECV<br>Video - SENDONLY | Two-Way Audio<br>One-Way Video<br>(to Sender) |
| Audio - SENDRECV | Audio - SENDONLY | One-Way Audio<br>(to Sender) |
| Video - SENDRECV | Video - RECVONLY | One-Way Video<br>(to Recipient) |

TABLE 1-continued

| Sender UE 102 | Recipient UE 104 | Result |
| --- | --- | --- |
| Audio - SENDRECV<br>Video - RECVONLY | Audio - SENDRECV<br>Video - RECVONLY | Audio-Only Call |
| Audio - SENDRECV<br>Video - SENDONLY | Audio - SENDRECV<br>Video - SENDONLY | Audio-Only Call |
| Audio - RECVONLY<br>Video - RECVONLY | Audio - RECVONLY<br>Video - RECVONLY | Call Failure |

Figure 3:
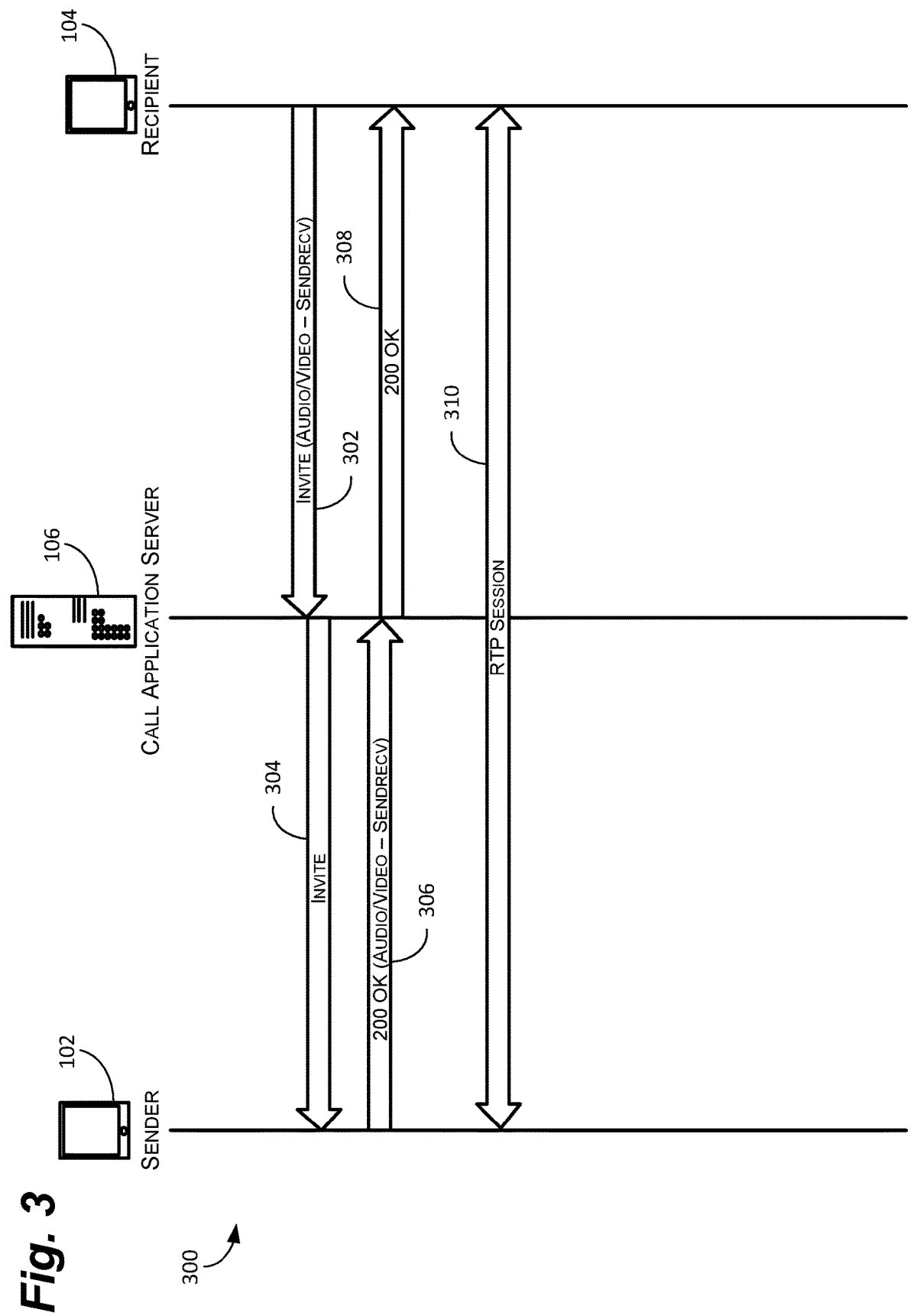
FIG. 3 is an example of a system for upgrading from a one-way video call to a two-way video call during the call, in accordance with some examples of the present disclosure.

As shown in FIG. 3, examples of the present disclosure can also comprise a system 300 for starting a two-way call after at least one part of the call (i.e., either audio or video) has initially been established one-way only. This may be useful, for example, to enable one caller to make a presentation and then later, enable the other to make a presentation. Or, a recipient can answer a call (video—RECVONLY) because they are getting dressed, for example, and then convert to a two-way video call once they are dressed. As discussed below, the UEs 102, 104 may include a graphical user interface (GUI) to enable the user to choose how to set up the call and when to change the set up.

Switching back and forth between one-way and two-way calling may also be an automatic process. In other words, the call may have initially been set up with one-way video due to network or UE conditions that have since improved. Thus, the sender UE 102 or the call application server 106 may monitor network and/or UE conditions; and, when the conditions reach a threshold, automatically renegotiate the call. If the call was initially set up with one-way video because the battery on one of the UEs 102, 104 was low, but the UE 102, 104 with the low battery has now been plugged in to charge, for example, this may trigger the renegotiation. Similarly, changes in signal strength or signal quality may also trigger a renegotiation.

In this example, the UEs 102, 104 have initially established a two-way audio call and a one-way video call with the video going from the sender UE 102 to the recipient UE 104. During the call, however, the recipient would like to convert to a two-way video call. To this end, at 302, the recipient UE 104 can send a new INVITE to the sender UE 102 to essentially "renegotiate" the session. Thus, the new INVITE can contain headers to set (audio—SENDRECV) and (video—SENDRECV)—i.e., as opposed to RECVONLY. At 304, the call application server can relay the INVITE to the sender UE 102.

Assuming that the sender UE 102 is willing and able to convert to two-way video, at 306, the sender UE 102 can send a 200 OK including headers that acknowledge the new parameters—i.e., (audio=SENDRECV) and (video=SENDRECV). At 308, the call application server 106 can relay the 200 OK to the recipient UE 104. At 310, an RTP session can be established between the UEs 102, 104 to enable two-way audio and two-way video to begin. In this example, the call has moved "up" from a one-way video call to a two-way video call.

Figure 4:
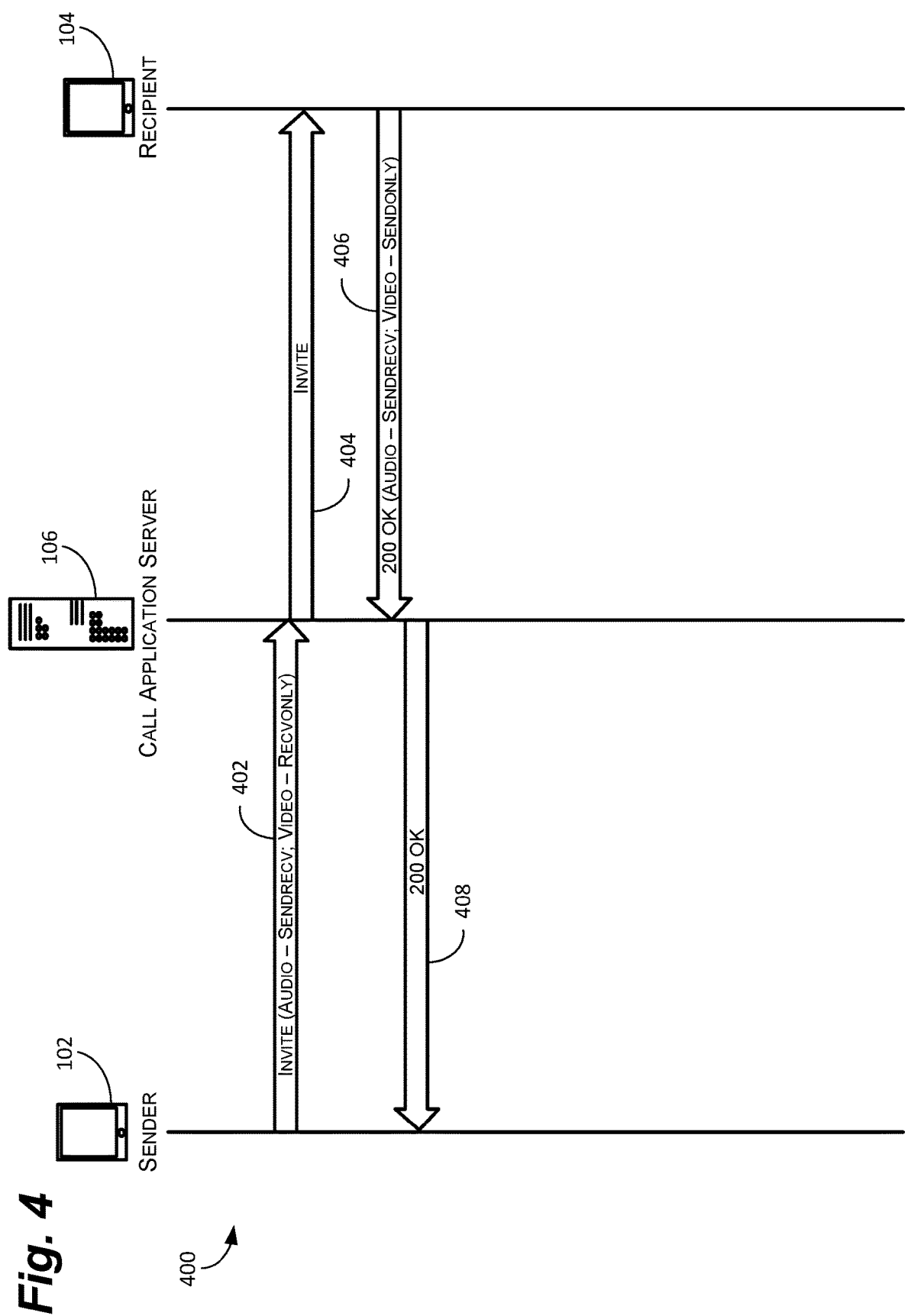
FIG. 4 is an example of a system for establishing and confirming a one-way video call during a call, in accordance with some examples of the present disclosure.

Of course, in some situations, it may be necessary to move "down" from a two-way video call to a one-way video call or even an audio-only call. To this end, as shown in FIG. 4, examples of the present disclosure can also comprise a system 400 for moving from a two-way video call to a one-way video call. This may be because one user has finished their presentation, for example, or due to changing UE or network conditions, among other things.

In this example, a two-way video call has already been established, but the sender UE 102 now needs to renegotiate the call to a one-way video call with video going from the recipient UE 104 to the sender UE 102 only. At 402, therefore, the sender UE 102 can send a new INVITE (within the same session) to renegotiate the parameters (audio—SENDRECV) and (video—RECVONLY). Thus, the sender UE 102 is attempting to establish a call on which there is a two-way audio channel, but only a one-way video channel (to the sender UE 102).

At 404, the call application server 106 can relay the INVITE to the recipient UE 104. As mentioned above, in some applications, the decision to switch the call up or down may be made automatically based on UE and/or network conditions. In other examples, the user may choose to move the call up or down via a GUI provided during calls, as discussed below in more detail with reference to FIGS. 6-8.

Regardless, at 406 if the recipient UE 104 accepts the new INVITE, the recipient UE 104 can response with a 200 OK acknowledging the new parameters (audio—SENDRECV) and (video—SENDONLY). At 408, the call application server 106 can relay the 200 OK to the sender UE 102. At this point, the call has been renegotiated to have two-way audio, but one-way video (from the recipient UE 104 to the sender UE 102).

Figure 5:
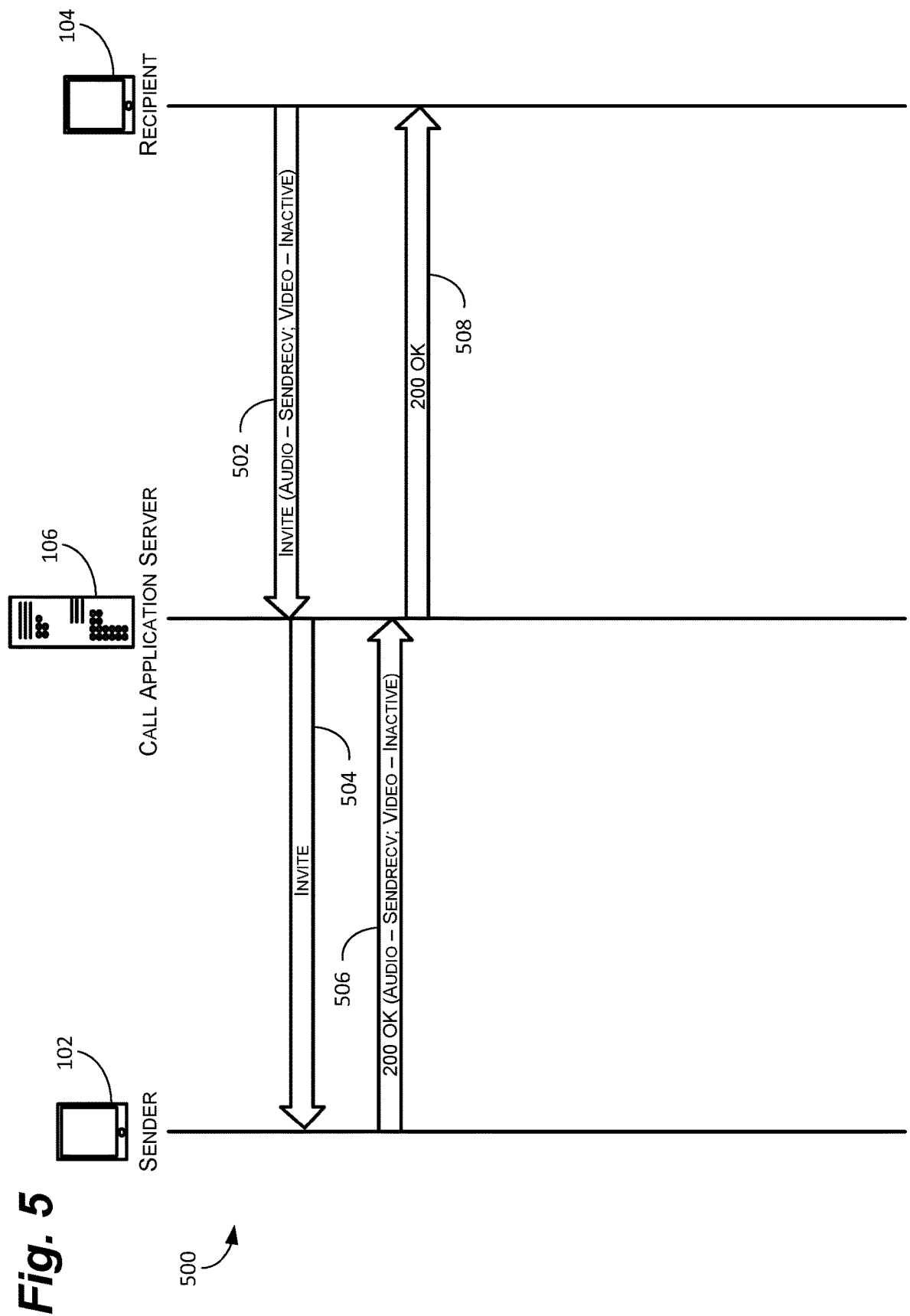
FIG. 5 is an example of a system for downgrading from a one-way or two-way video call to an audio-only call during the call, in accordance with some examples of the present disclosure.

As shown in FIG. 5, examples of the present disclosure can comprise a system 500 of dropping from a two-way video call to an audio-only call. After establishing a two-way video call, for example, one of the UEs 102, 104 may request to drop to an audio-only call. This may be because the signal strength or signal quality at one or both of the UEs 102, 104 has fallen below a threshold, for example, or because the battery on one or both of the UEs 102, 104 is low. This may also simply be by the user's choice—e.g., they no longer wish to send or receive video.

In this example, after establishing a two-way video call, the recipient UE 104 (or the user) wants to renegotiate from the two-way video call to an audio-only call. At 502, the recipient UE 104 can send a new INVITE including the new parameters (audio—SENDRECV) and (video—INACTIVE). This maintains the two-way audio channel, but cancels the video channel altogether. AT 504, the call application server 106 can relay the INVITE to the sender UE 102.

At 506, the sender UE 102 can send a 200 OK acknowledging the new parameters. At 508, the call application server 106 can relay the 200 OK to the recipient UE 104 and the call is transitioned to an audio-only call. As before, this may be in response to changing conditions or simply because the users no longer need the video connection.

Figure 6:
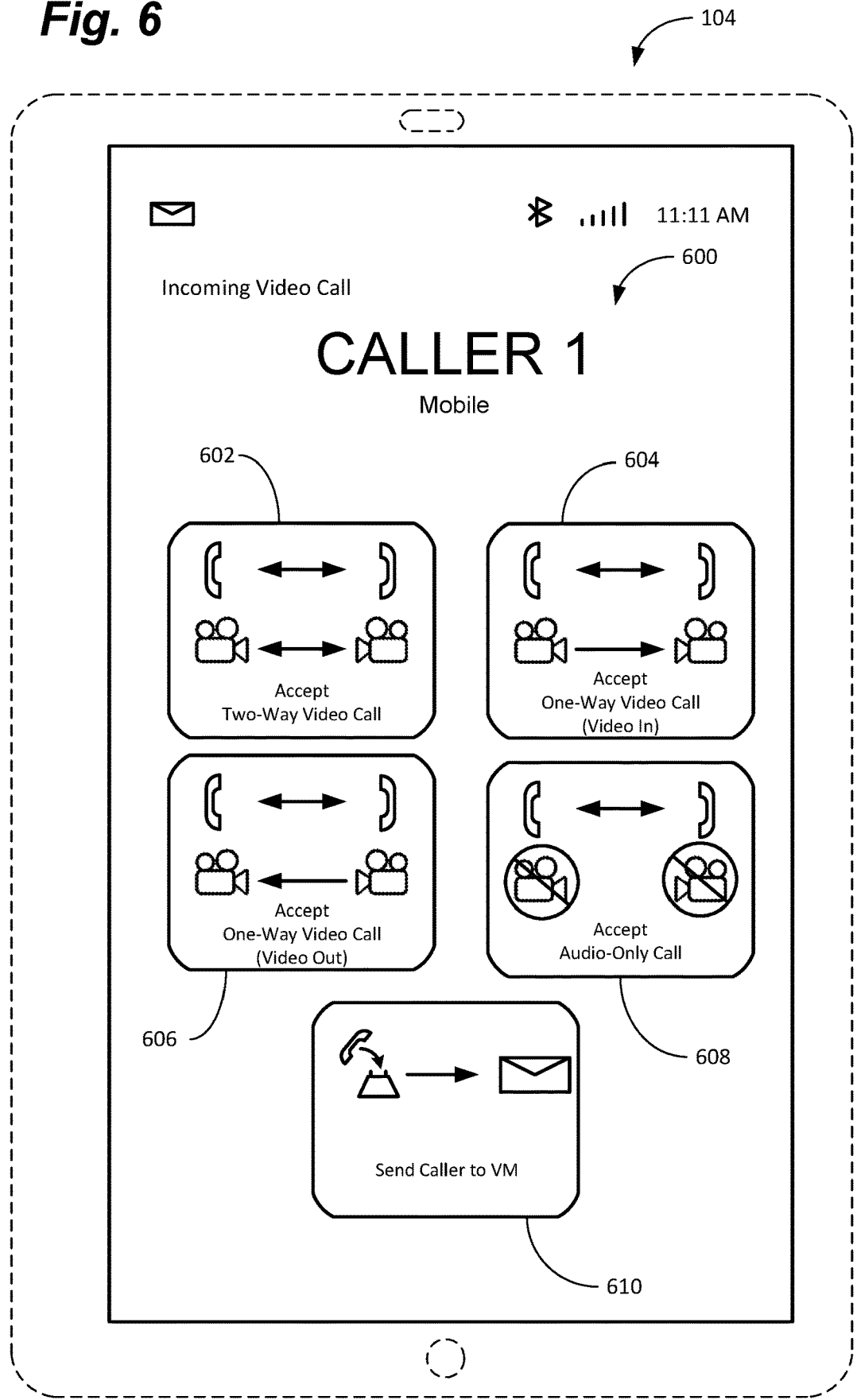
FIG. 6 is an example of a multi-way video graphical user interface (GUI) for use with the systems and methods disclosed herein, in accordance with some examples of the present disclosure.

As shown in FIG. 6, examples of the present disclosure can also comprise a multi-way video GUI 600 to provide users with multiple options when receiving a video call. Thus, rather than just providing accept or decline for video calls, the multi-way video GUI 600 can provide additional options for two-way, one-way, and audio only calls. These new features can be provided on a touchscreen or keyboard of the UEs 102, 104, for example, with each button corresponding to a different combination of features.

As shown in FIG. 6, the multi-way video GUI 600 can include multiple buttons or other input elements to enable users to place and receive two-way video calls, one-way video calls, and audio-only calls, among other things. In this example, the recipient UE 104 is receiving a video call from Caller 1 and is presented with multiple options on the multi-way video GUI 600. In some examples, the multi-way video GUI 600 can include a two-way video call button 602 to enable the user to establish a conventional two-way video call—i.e., a bidirectional video channel and a bidirectional audio channel are both established.

In this case, however, the user is also provided with additional options. To this end, the multi-way video GUI 600 can also include a video-in button 604. With the video-in button 604, the recipient UE 104 can establish a call that establishes a bidirectional audio channel, but a video channel that only receives video. As discussed above, if the recipient UE 104 received an INVITE for a two-way video call (audio—SENDRECV, video—SENDRECV), but the user selects the video-in button 604, the recipient UE 104 can respond to the call with a 200 OK with updated parameters (audio—SENDRECV, video—RECVONLY). Assuming that the sender UE 102 accepts the modified call, the multi-way video GUI 600 has enabled the user to establish a one-way video (in) call. This may be useful when the user is attending a seminar, for example, and wants to receive, but not send, video.

Similarly, the multi-way video GUI 600 can also include a video-out button 606. As the name implies, the video-out button 606 can enable the user to establish a two-way audio call, but a one-way video call with the video going from the recipient UE 104 to the sender UE 102. Thus, if the recipient UE 104 received an INVITE for a video call (audio—SENDRECV, video—SENDRECV), but the user selects the video-out button 606, the recipient UE 104 can respond to the call with a 200 OK with updated parameters (audio—SENDRECV, video SENDONLY). This may be useful when the user is making a presentation to a large group, for example, and does not need video in from the group.

The multi-way video GUI 600 can also include an audio-only button 608. This can enable the user to establish an audio-only call despite the fact that the recipient UE 104 has requested a video call. Thus, if the recipient UE 104 received an INVITE for a video call (audio—SENDRECV, video—SENDRECV), but the user selects the audio-only button 608, the recipient UE 104 can respond to the call with a 200 OK with updated parameters (audio—SENDRECV, video—INACTIVE). Assuming the recipient UE 104 accepts the new parameters, an audio-only call can be established. This may be useful if the battery is low on the recipient UE 104, for example, or the recipient UE 104 has poor signal strength, among other things.

Finally, the multi-way video GUI 600 can include a voicemail button 610. When selected, the voicemail button 610 can essentially decline the video call and send Caller 1 directly to voicemail. If the recipient UE 104 has video voicemail, then Caller 1 can be sent to video voicemail to leave a video and audio message for the user. In many cases, the recipient UE 104 may only have audio voicemail, however; thus, the recipient UE 104 can first renegotiate the call and then send Caller 1 to voicemail. In this case, the recipient UE 104 essentially sends the same response that is used to establish an audio-only call—200 OK (audio—SENDRECV; video INACTIVE)—and then sends the sender UE 102 to voicemail. This can enable Caller 1 to leave an audio-only voicemail message for the user.

Figure 7:
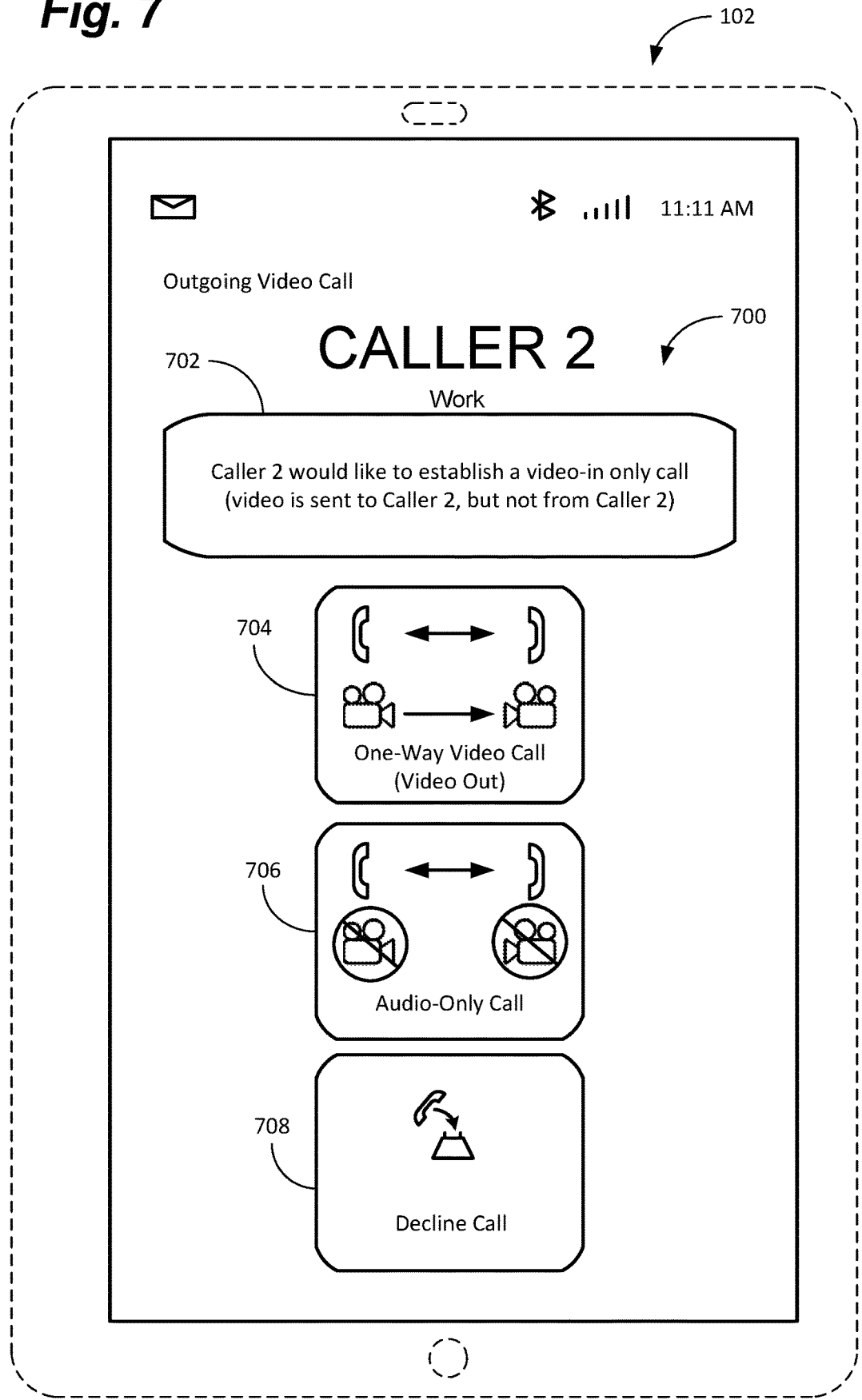
FIG. 7 is an example of a call modification GUI for use with the systems and methods disclosed herein, in accordance with some examples of the present disclosure.

As shown in FIG. 7, examples of the present disclosure can also comprise a call modification GUI 700 to enable the sender to renegotiate or decline the call when an initial INVITE is modified by the recipient. In other words, if the sender initially attempts to establish a video call with the recipient, but the recipient downgrades the call in some way, the sender can be provided with the call modification GUI 700 with one or more choices in response. If the recipient is unavailable for a video call and attempts to downgrade to an audio-only call, for example, the recipient may decline the call altogether—e.g., because video is essential to the call for some reason. This may be because the sender wants visual approval of something (e.g., a paint color) or simply because the sender wants to have a "face-to-face" discussion.

In this example, the sender UE 102 is attempting to place a video call to the recipient UE 104, but the recipient UE 104 has responded with a one-way video call. Thus, the sender UE 102 sent an INVITE (audio—SENDRECV; video—SENDRECV) to the recipient UE 104, but the recipient UE 104 responded with a one-way video call 200 OK (audio—SENDRECV, video—RECVONLY).

In response to the change in parameters, therefore, the call modification GUI 700 can provide a notification 702 to the sender detailing the new parameters. In this example, the notification 702 can inform the sender that the recipient wishes to establish a one-way video call with video going from the sender to the recipient only—"Caller 2 would like to establish a video-in only call." Of course, the notification 702 can be different based on how the recipient UE 104 replies and the desired language. If the recipient UE 104 reply requests an audio-only call, for example, then the notification 702 can read, "Caller 2 would like to establish an audio-only call."

In this example, since the recipient UE 104 has requested a one-way video call, the sender has at least three choices—accept the one-way video call, drop to an audio-only call, or decline the call altogether. To this end, the one-way video button 704 can enable the recipient UE 104 top accept the call with the new, requested parameters. In this case, selecting the one-way video button 704 can cause the sender UE 102 to send a 200 OK with the new parameters (audio—SENDRECV; video—SENDONLY) to establish the one-way video call.

If the sender wishes to drop to an audio-only call, on the other hand, then the sender can select the audio-only button 706. The selection of the audio-only button 706 can cause the sender UE 102 to attempt to renegotiate the call with yet another set of parameters (audio—SENDRECV; video—INACTIVE). On the recipient UE 104, this may cause the multi-way video GUI 600 to display the audio-only button 608 to prompt the recipient to assent to the second, new set of parameters (i.e., by pressing the audio-only button 608). This may be useful when the sender feels that two-way video is preferred, and that one-way video will not be any more useful than an audio-only call. This may also be useful to enable the users to quickly touch base to set up a later time for a video call (e.g., when only a video call will suffice).

In some examples, the call modification GUI 700 can also include a decline button 708. This may be selected because the sender believes that a two-way video call is the only acceptable method of communications, for example, or that that sender will simply try again later. Thus, in response to the modified parameters (audio—SENDRECV; video RECVONLY), for example, when the decline button 708 is selected, the sender UE 102 can send an appropriate message to the recipient UE 104 (e.g., 403 FORBIDDEN) to terminate the call.

Figure 8:
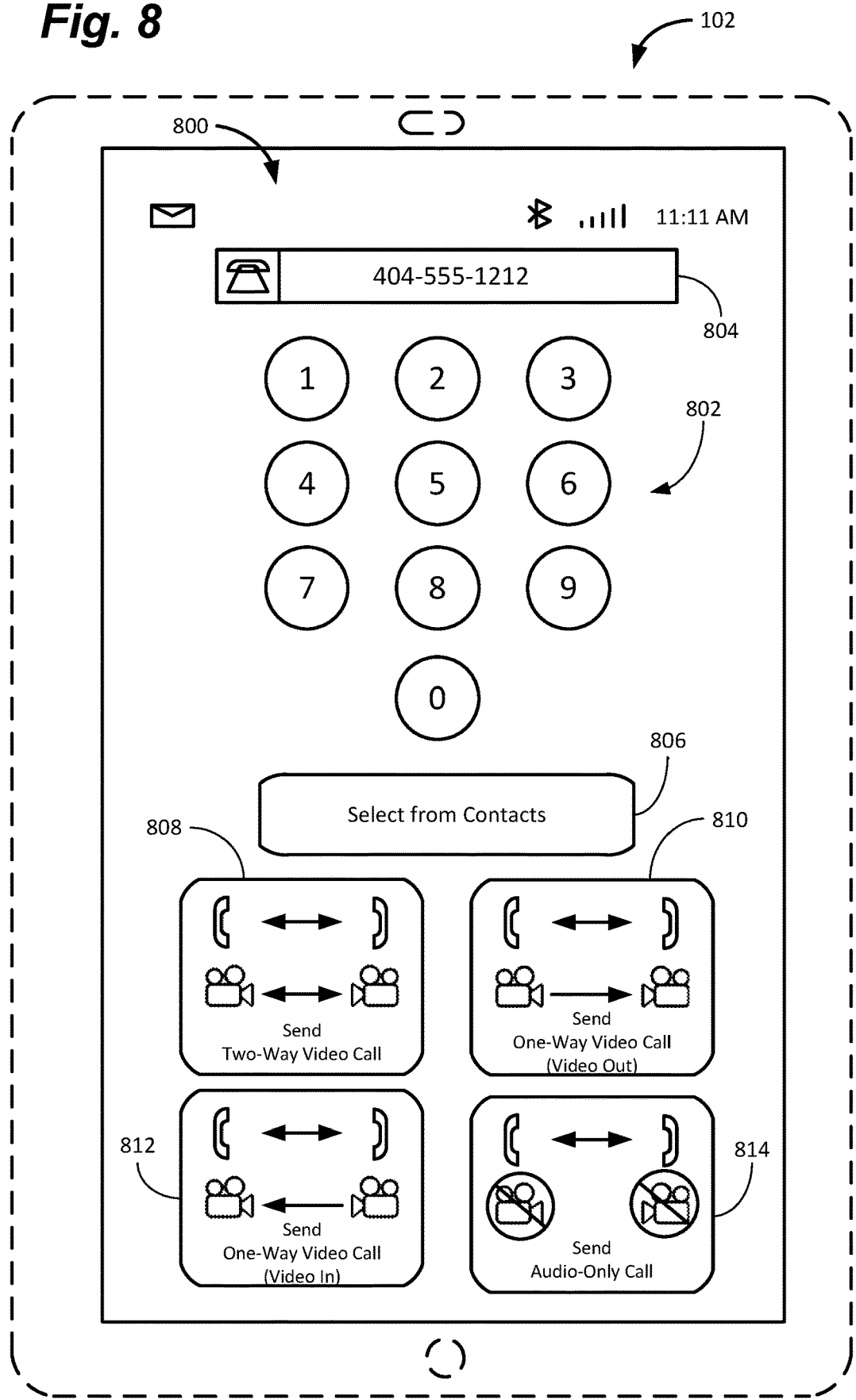
FIG. 8 is an example of a call initiation GUI for use with the systems and methods disclosed herein, in accordance with some examples of the present disclosure.

As shown in FIG. 8, examples of the present disclosure can also comprise a call initiation GUI 800. As the name implies, the call initiation GUI 800 can provide the user with the ability to place multiple types of calls. Thus, the call initiation GUI 800 can be similar to the multi-way video GUI 600, but on an outgoing basis. The call initiation GUI can have some of the same functions as the multi-way video GUI 600, but with some services removed and some added, as appropriate. As can be understood, for example, in some cases the call initiation GUI 800 may include the voicemail button 610 as an optional element.

In some examples, to facilitate placing calls, the call initiation GUI 800 can include a facility to enable the sender to dial or to select the appropriate contact. Thus, the call initiation GUI 800 can include a standard number pad 802 and dialer window 804 to display the selected number or contact. In some examples, the call initiation GUI 800 can also include a contacts button 806 to enable the user to select an existing contact to call.

Like the multi-way video GUI 600, the call initiation GUI 800 can also include various combinations of video and audio directionality. Unlike the multi-way video GUI 600, however, the call initiation GUI 800 includes buttons for placing calls, rather than accepting calls. Thus, rather than having a single send button, for example, the call initiation GUI 800 can include multiple send buttons to establish different types of calls.

In some examples, the call initiation GUI 800 can include a two-way video send button 808. After selecting a contact or dialing a number, the selection of the two-way video send button 808 will cause the sender UE 102 to send an INVITE to the recipient UE 104 with the parameters for a video call (audio—SENDRECV; video—SENDRECV). If the recipient UE 104 accepts the video call—i.e., sends a 200 OK (audio—SENDRECV; video—SENDRECV)—then a two-way video call is established with bidirectional video and bidirectional audio channels.

Similarly, selecting the one-way video out send button 810 causes the sender UE 102 to try to establish a call with two-way audio, but one-way video (from the sender UE 102 to the recipient UE 104). Thus, selecting the one-way video out send button 810 causes the sender UE 102 to send an INVITE (audio—SENDRECV; video—SENDONLY). The one-way video call is then established if the recipient UE 104 responds with the expected 200 OK (audio—SENDRECV; video—RECVONLY).

Selecting the one-way video in send button 812, on the other hand, causes the sender UE 102 to try to establish a call with two-way audio, but one-way video (from the recipient UE 104 to the sender UE 102). Thus, selecting the one-way video in send button 812 causes the sender UE 102 to send an INVITE (audio—SENDRECV; video—RECVONLY). The one-way video call is then established if the recipient UE 104 responds with the expected 200 OK (audio—SENDRECV; video—SENDONLY). This may be useful if the sender is connecting to a seminar or a video conference in which the sender is not the presenter, for example.

Finally, the call initiation GUI 800 can also include an audio-only send button 814. The audio-only send button 814 can function similarly to a standard send button. Thus, the audio-only send button 814 can enable the sender to establish a standard audio-only phone call. Selection of the audio-only send button 814, therefore, can cause the sender UE 102 to send an audio-only INVITE (audio—SENDRECV; video—INACTIVE). Thus, an appropriate 200 OK (audio—SENDRECV; video—INACTIVE) can establish a conventional voice call.

Of course, some users may find other combinations and permutations useful. A user who wishes to connect silently to a video seminar, for example, may wish to connect with one-way video and one-way audio. Thus, using similar logic, the sender UE 102 can send an INVITE to the presenter with the appropriate parameters (audio RECVONLY; video—RECVONLY). The recipient UE 104 can then send the appropriate 200 OK (audio—SENDONLY; video—SENDONLY) to establish the call. This may be useful for the sender to attend a video conference, for example, without other attendees hearing a dog barking or a baby crying in the background.

Indeed, in the case of a seminar, the recipient (e.g., the presenter) may already have the recipient UE 104 configured to automatically send a response with these parameters regardless of what the INVITE from the sender UE 102 contains. In other words, even if the sender UE 102 attempts to establish a two-way video call, the response from the recipient UE 104 can automatically include the appropriate parameters—in this example, (audio—SENDONLY; video—SENDONLY). This can eliminate the need for participants to mute their microphones during the call, which is a common problem during conference calls and video conferences.

Thus, while several combinations and permutations have been discussed above, other combinations and permutations are available. The users can choose many combinations of one-way (in either direction) or two-way video and one-way (in either direction) or two-way audio to suit a variety of needs. A similar GUI could also be used to change call types during a call—i.e., essentially the counterpart to the call modification GUI 700. The GUIs 600, 700, 800, therefore, can be used both to establish new types of calls and to renegotiate calls in real-time as requested by the users. Users can establish one-way and two-way video and one-way and two-way audio for use in various applications. As used herein, "real time" simply denotes that the calls are carried out (negotiated, renegotiated, connected, etc.) in as little time as is practical given the inherent involvement of humans, electronics, networks, etc. One of skill in the art will recognize that, due to user, UE, and network delays, among other things, these processes are not "instantaneous."

Figure 9:
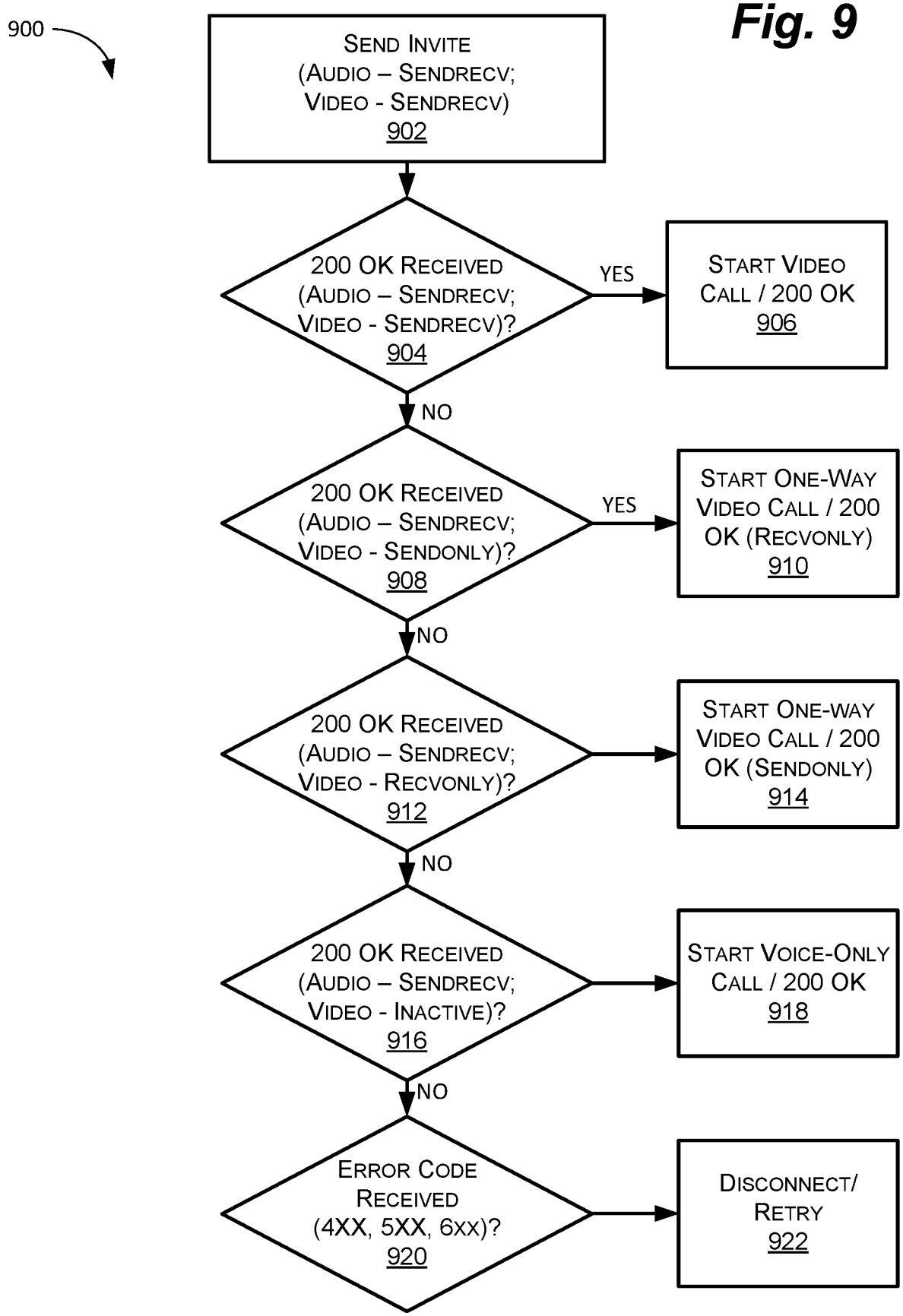
FIG. 9 is a method for establishing a two-way video call, a one-way video call, or an audio only call, in accordance with some examples of the present disclosure.

FIG. 9 is an example of a method 900 for handling the above-mentioned calling options. The method 900 enables UE (e.g., the sender UE 102) to attempt to establish a two-way video call and then take appropriate actions based on the response from the recipient (e.g., the recipient UE 104). The method 900 could be implemented as an application on the UEs 102, 104, for example, or could be implemented on an application server (e.g., the call application server 106 or another network entity), a cloud server, or other entity.

At 902, the sender UE 102 can send an INVITE to the recipient UE 104 requesting a two-way video call. As mentioned above, the INVITE can include the appropriate parameters (audio—SENDRECV; video SENDRECV) to request a two-way video call.

At 904, the sender UE 102 can determine whether the parameters in the response (e.g., a 200 OK) received from the recipient UE 104 are associated with a two-way video call. The response from the recipient UE 104 may be based on many factors including current network conditions (e.g., signal strength and signal quality), current UE conditions (e.g., battery life, processor availability, camera status, etc.). The response from the recipient UE 104 can also be based on user preference based on the recipient's input on the multi-way video GUI 600.

Either way, if the response includes the correct parameters for a video call (audio—SENDRECV; video SENDRECV), then at 906 the sender UE 102 can send any final signaling (e.g., an additional 200 OK) and the sender UE 102 and the recipient UE 104 can establish a two-way video call. The two-way video call can include a bidirectional video channel and a bidirectional audio channel.

If, on the other hand, the response does not include the correct parameters for a two-way video call, then at 908 the sender UE 102 can determine if the response is associated with a one-way video-in call (audio—SENDRECV; video SENDONLY), indicating the recipient UE 104 wants to send video to the sender UE 102, but does not want to receive video from the sender UE 102. As mentioned above, this may be useful when the sender is dialing in to a video conference or seminar at which they are not presenting.

If the sender UE 102 determines the response is associated with a one-way video-in call, the at 910 the sender UE 102 can send a 200 OK with the complementary parameters—in this case, Audio—SENDRECV; video RECVONLY. This establishes a bidirectional audio channel and a one-way video channel from the recipient UE 104 to the sender UE 102.

If the sender UE 102 determines the response is not associated with a one-way video-in call, then at 912, the sender UE 102 can determine if the response from the recipient UE 104 is associated with a one-way video-out call (audio—SENDRECV; video RECVONLY). This may be useful when the sender is a presenter on a call, for example, or simply when the recipient is not dressed, or otherwise indisposed, and does not want to provide video.

If the sender UE 102 determines the response is associated with a one-way video-out call, then at 914 the sender UE 102 can send a 200 OK with the complementary parameters—in this case, Audio—SENDRECV; video SENDONLY. This established a bidirectional audio channel and a one-way video channel from the sender UE 102 to the recipient UE 104.

If the sender UE 102 determines the response is not associated with a one-way video-out call, then at 916, the sender UE 102 can determine if the response from the recipient UE 104 is associated with an audio-only call (audio—SENDRECV; video INACTIVE). This may be useful when the recipient UE 104 does not have a functioning camera, for example, based on user preferences, or due to network or other conditions that prevent the use of video.

If the sender UE 102 determines the response is associated with an audio-only call, then at 918 the sender UE 102 can send a 200 OK with the complementary parameters—in this case, Audio—SENDRECV; video INACTIVE. This established a bidirectional audio channel, but no video channel.

At 920, if none of the expected 200 OK responses is received, the method 900 can determine if an error code has been received (e.g., a 4XX, 5XX, or 6XX error code) or if no response is received at all. If, for example, the sender UE 102 receives a 403 FORBIDDEN, then, at 922 the sender UE 102 may simply disconnect from the call and display an error message. If, on the other hand, the sender UE 102 receives a 504 SERVER TIMEOUT, then at 922 the sender UE 102 may retry the call again after a predetermined amount of time.

Any of these responses could be due to user preference, as indicated by an input by the recipient on the recipient UE 104 (e.g., selecting a button on the multi-way video GUI 600). These responses could also be caused by the network "downgrading" calls due to unfavorable conditions. A network entity (e.g., the call application server 106) could include an algorithm that downgrades calls in a stepwise manner based on current network traffic, available bandwidth, maintenance issues, etc.

Figure 10:
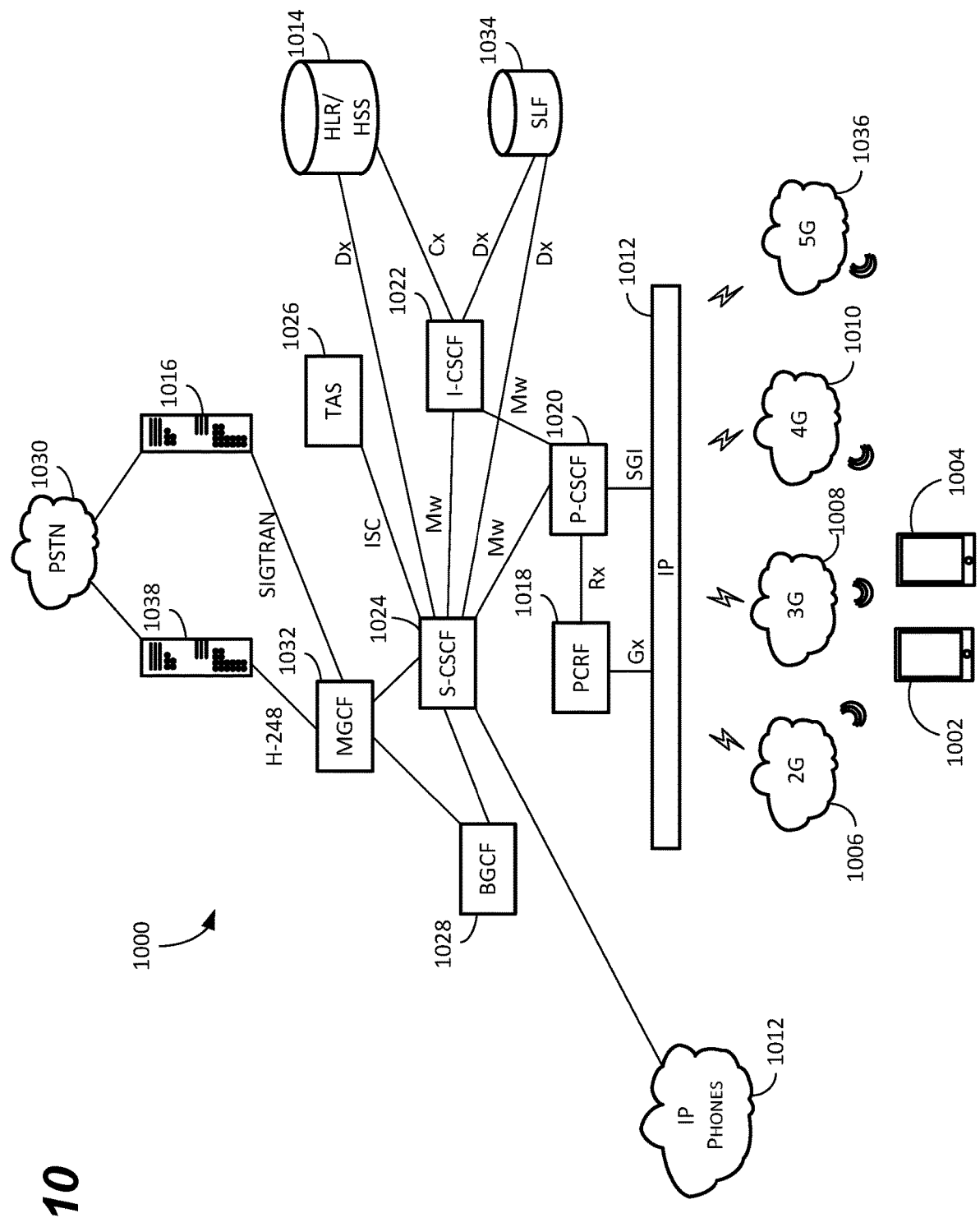
FIG. 10 is an example of an internet multimedia subsystem (IMS) for use with the systems and methods discussed herein, in accordance with some examples of the present disclosure.

FIG. 10 includes the internet protocol multimedia subsystem (IMS) 1000 for the 4G LTE 1010 and 5G 1036 networks. As shown, the IMS 1000 includes several network components for routing signals, storing subscriber information, and connecting across various subsystems and network types. The IMS 1000 is built on SIP as is the base to further support packaging of voice, video, data, fixed, and mobile services on a single platform to end users. It enables communications across multiple types of networks, including cellular, satellite, broadband, cable, and fixed networks, and enables the creation of efficient interoperating networks. The IMS 1000 can also enable the new SIP commands for providing one-way video calling discussed above with respect to FIGS. 2-9.

The IMS 1000 also provides interoperability for UEs 1002, 1004 (e.g., the sender UE 102 and the recipient UE 104) and other devices across multiple platforms including, for example, 2G 1006, 3G 1008, 4G 1010, 5G 1036, and IP 1012 networks. The IMS 1000 also includes a variety of network entities for providing a variety of services, including the one-way video calling services discussed herein. In some examples, the IMS 1000 can include, for example, a home location register/home subscriber service (HLR/HSS) 1014, service architecture evolution gateway (SAE GW) 1016, and a policy and charging rules function (PCRF) 1018.

The HLR/HSS 1014 is a central database that contains user-related and subscription-related information. The functions of the HLR/HSS 1014 include functionalities such as mobility management, call and session establishment support, user authentication and access authorization. The HSS, which is used for LTE connections, is based on the previous HLR and authentication center (AuC) from CGMA and GSM technologies, with each serving substantially the same functions for their respective networks.

To this end, the HLR/HSS 1014 can also serve to provide routing instructions (e.g., IP addresses or phone numbers for the various call types), and provide any billing associated with video calls, for example. So, for example, the sender UE 102 can send the messages to the call application server 106, which can then provide information to the HLR/HSS 1014 with the necessary credentials to enable the sender UE 102 to access the IMS 1000. Once authenticated, the HLR/HSS 1014 can then ensure the user is authorized to make video calls, for example, or send an authorization request to a third-generation partnership project authentication, authorization, and accounting (3GPP AAA) server, among other things.

The SAE GW 1016 routes and forwards user data packets, while also acting as the mobility anchor for the user plane during inter-eNodeB handovers and as the anchor for mobility between 4G LTE 1010, 5G 1036, and other 3GPP technologies including, for example, terminating the S4 interface and relaying the traffic between 2G 1006/3G 1008 systems and the packet data network gateway (PGW). For idle state UEs, the SAE GW 1016 terminates the downlink data path and triggers paging when downlink data arrives for the UEs 1002, 1004. It manages and stores UE 1002, 1004 contexts such as, for example, parameters of the IP bearer service and network internal routing information.

The PCRF 1018 is a software node that determines policy rules in the overall cellular network, and the IMS 1000 specifically. The PCRF 1018 generally operates at the network core and accesses subscriber databases (e.g., the HLR/HSS 1014) and other specialized functions, such as content handling (e.g., whether the user has sufficient data left in their plan to receive a video call), in a centralized manner. The PCRF 1018 is the main part of the IMS 1000 that aggregates information to and from the IMS 1000 and other sources. The PCRF 1018 can support the creation of rules and then can automatically make policy decisions for each subscriber active on the IMS 1000. The PCRF 1018 can also be integrated with different platforms like rating, charging, and subscriber databases or can also be deployed as a standalone entity.

The IMS 1000 also includes the P-CSCF 1020. The P-CSCF 1020 is the entry point to the IMS 1000 and serves as the outbound proxy server for the UEs 1002, 1004. The UEs 1002, 1004 attach to the P-CSCF 1020 prior to performing IMS registrations and initiating SIP sessions. The P-CSCF 1020 may be in the home domain of the IMS operator, or it may be in the visiting domain, where one or more of the UEs 1002, 1004 are currently roaming. For attachment to a given P-CSCF 1020, the UEs 1002, 1004 perform P-CSCF 1020 discovery procedures. Attachment to the P-CSCF 1020 enables the UEs 1002, 1004 to initiate registrations and sessions with the IMS 1000.

The IMS 1000 also includes an interrogating-call session control function (I-CSCF) 1022. The I-CSCF 1022 acts as an inbound SIP proxy server in the IMS 1000. During IMS registrations, the I-CSCF 1022 queries the HLR/HSS 1014 to select the appropriate serving-call session control function (S-CSCF 1024), discussed below, which can serve the UEs 1002, 1004. During IMS sessions, the I-CSCF 1022 acts as the entry point to terminating session requests. The I-CSCF 1022 routes the incoming session requests to the S-CSCF 1024 of the called party.

The S-CSCF 1024 acts as a registrar server, and in some cases, as a redirect server. The S-CSCF 1024 facilitates the routing path for mobile-originated or mobile-terminated session requests. The S-CSCF 1024 also interacts with various components for playing tones and announcements, among other things. For the systems 200, 300, 400, 500, discussed above, the S-CSCF 1024 can receive messages from the UEs 1002, 1004 or the HLR/HSS 1014, for example, and establish the appropriate sessions with the call application server 106 or other telephony applications servers (TASs) 1026 according to the services requested by the UEs 1002, 1004.

The IMS 1000 also includes a breakout gateway control function (BGCF) 1028. The BGCF 1028 is the IMS 1000 element that selects the network in which public switched telephone network (PSTN) 1030 (discussed below) breakout is to occur. If the breakout is to occur in the same network as the BGCF 1028, for example, then the BGCF 1028 selects a media gateway control function (MGCF) 1032 (also discussed below) that will be responsible for interworking with the PSTN 1030. The MGCF 1032 then receives the SIP signaling from the BGCF 1028.

The IMS 1000 also includes a subscriber location function (SLF) 1034. The SLF 1034 provides information about the HLR/HSS 1014 that is associated with a particular user profile. It is generally implemented using a database. If the IMS 1000 contains more than one HLR/HSS 1014, then the I-CSCF 1022 and S-CSCF 1024 will communicate with SLF 1034 to locate the appropriate HLR/HSS 1014 based on the user profile.

The IMS 1000 also includes the aforementioned TAS(s) 1026 (e.g., the call application server 106). As the name implies, the TAS 1026, sometimes known in a telephony context merely as an application server (AS), is a component used to provide telephony applications and additional multimedia functions. The TAS 1026 can include any entity in a telephone network that carries out functions that are not directly related to the routing of messages through the network. Such functions can include, for example, in-network answering machines, automatic call forwarding, conference bridges and other types of applications. And, while shown as a single entity in FIG. 10, multiple TASs 1026 are generally used to provide multiple services. Based on the services requested by the UE 1002, 1004 to the S-CSCF 1024, for example, the S-CSCF 1024 can establish sessions with one or more TASs 1026, one TAS 1026 for each service.

The IMS 1000 also includes the MGCF 1032. The MGCF 1032 is a SIP endpoint that handles call control protocol conversion between SIP and ISDN user part (ISUP)/bearer-independent call control (BICC) and interfaces with the SAE GW 1016 over stream control transmission protocol (SCTP). The MGCF 1032 also controls the resources in a media gateway (MGW) 1038 across an H.248 interface. The MGW 1038 is a translation device or service that converts media streams between disparate telecommunications technologies such as POTS, SS7, next generation networks (2G 1006, 3G 1008, 4G LTE 1010, and 5G 1036) or private branch exchange (PBX) systems.

Finally, the IMS 1000 also includes the PSTN 1030. The PSTN 1030 is the world's collection of interconnected voice-oriented public telephone networks, both commercial and government-owned. In some cases, the PSTN 1030 can also be referred to as the plain old telephone service (POTS). With respect to IP phones 1012, for example, the PSTN 1030 furnishes much of the Internet's long-distance infrastructure. Because internet service providers (ISPs) pay long-distance providers for access to their infrastructure and share the circuits among many users through packet-switching (discussed above), internet users avoid having to pay usage tolls to anyone other than their ISPs.

Figure 11:
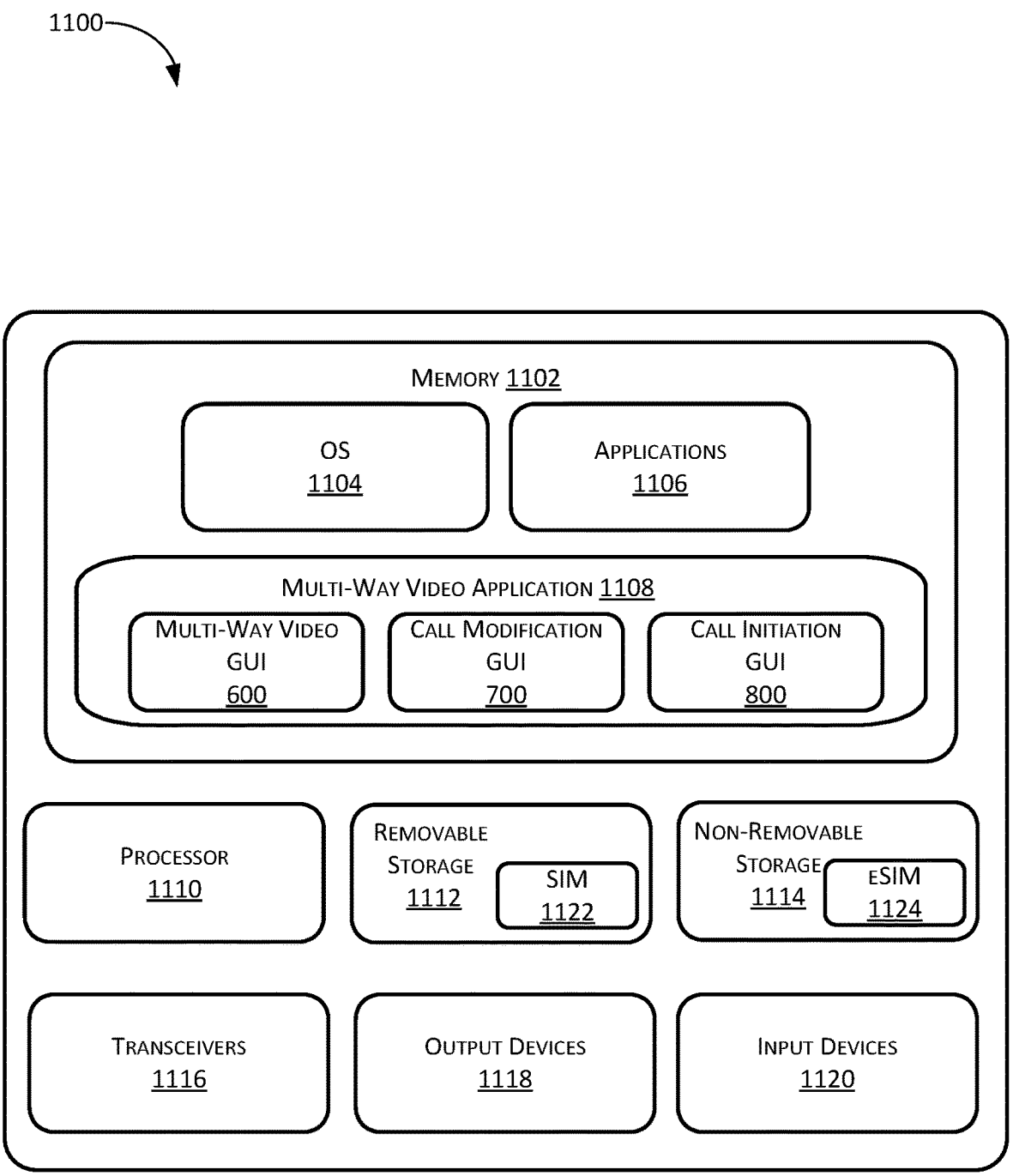
FIG. 11 is an example of a user equipment (UE) for use with the systems and methods disclosed herein, in accordance with some examples of the present disclosure.

FIG. 11 depicts a component level view of a UE 1100 (e.g., the sender UE 102 or the recipient UE 104) for use with the systems 200, 300, 400, 500, 1000; GUIs 600, 700, 800; and methods 900 described herein. The UE 1100 could be any UE able to send and receive video and/or audio calls in the cellular network. For clarity, the UE 1100 is described herein generally as a cell phone or smart phone. One of skill in the art will recognize, however, that the systems 200, 300, 400, 500, 1000; GUIs 600, 700, 800; and methods 900 described herein can also be used with a variety of other electronic devices, such as, for example, tablet computers, laptops, desktops, and other network (e.g., cellular or IP network) connected devices.

The UE 1100 can comprise several components to execute the above-mentioned functions. As discussed below, the UE 1100 can each comprise memory 1102 including an operating system (OS) 1104 and one or more standard applications 1106. The standard applications 1106 can include many features common to UE such as, for example, contacts, calendars, call logs, voicemail, etc. In this case, the UE 1100 can also comprise a multi-way video application 1108.

The UE 1100 can also comprise one or more processors 1110 and one or more of removable storage 1112, non-removable storage 1114, transceiver(s) 1116, output device(s) 1118, and input device(s) 1120. In some examples, such as for cellular communication devices, the UE 1100 can also include a SIM 1122 and/or an eSIM 1124, which can include a mobile country code (MCC), mobile network code (MNC), international mobile subscriber identity (IMSI), and other relevant information. In some examples, one or more of the functions (e.g., standard applications 1106 and/or the multi-way video application 1108) can be stored on the SIM 1122 or the eSIM 1124 in addition to, or instead of, being stored in the memory 1102.

In various implementations, the memory 1102 can be volatile (such as random access memory (RAM)), non-volatile (such as read only memory (ROM), flash memory, etc.), or some combination of the two. The memory 1102 can include all, or part, of the functions 1106, 1108 and the OS 1104 for the UE 1100, among other things. In some examples, rather than being stored in the memory 1102, some, or all, of the functions 1106, 1108, as well as other information (e.g., call history, contacts, etc.) can be stored on a remote server or cloud of servers accessible by the UE 1100 such as the call application server 106.

The memory 1102 can also include the OS 1104. Of course, the OS 1104 varies depending on the manufacturer of the UE 1100 and currently comprises, for example, iOS 11.4.1 for Apple products and Pie for Android products. The OS 1104 contains the modules and software that support a computer's basic functions, such as scheduling tasks, executing applications, and controlling peripherals. In some examples, the OS 1104 can receive signals from the multi-way video application 1108, for example, to enable the UE 1100 to make one-way, two-way, and audio-only calls, among other things. The OS 1104 can also enable the UE 1100 to send and retrieve data via a cellular data connection or internet connection and perform other functions.

The UE 1100 can also include a multi-way video application 1108 capable of performing some, or all, of the functions associated with one or more of the systems 200, 300, 400, 500, 1000 and methods 900, discussed above. So, the multi-way video application 1108 can receive inputs from the GUIs 600, 700, 800 or other input devices 1120, formulate parameters based on the inputs, and then cause the transceiver(s) 1116 to send the appropriate messages. In some examples, the multi-way video application 1108 can also include the GUIs 600, 700, 800. In this configuration, the multi-way video application 1108 can also receive notifications of incoming video calls or call modifications, for example, and cause the UE 1100 to display the appropriate GUI 600, 700, 800, among other things.

In some examples, the multi-way video application 1108 may also monitor various parameters and automatically manage calls. In other words, in some examples, the multi-way video application 1108 can monitor battery levels, processor load, and other UE 1100 parameters (e.g., via the OS 1104) and downgrade calls automatically based on these parameters. While on a two-way video call, for example, if the multi-way video application 1108 determines that the battery level falls below a first predetermined threshold (e.g., 10% or 20%), the multi-way video application 1108 can provide the user with a warning message. If the battery level continues to fall to below a second predetermined threshold (e.g., 5% or 10%), then the multi-way video application 1108 can automatically downgrade the call to a one-way video call or an audio-only call, as necessary.

In some examples, the multi-way video application 1108 may also perform similar operations based in part on information provided by the cellular network (e.g., traffic levels, signal strength, signal quality, etc.). In some examples, the multi-way video application 1108 may receive instructions from the cellular network, for example, and then take actions (e.g., upgrade or downgrade video calls) based on the information or instructions. So, the cellular network may send a message indicating that traffic levels have reached a predetermined threshold and that a current video call needs to be downgraded to an audio-only call. The multi-way video application 1108 can then provide a notification to the user, send the appropriate SIP messaging, and downgrade the call automatically.

Similarly, rather than receiving instructions from the cellular network, the multi-way video application 1108 may receive data from the cellular network and then make decisions regarding upgrading or downgrading calls. If the user is on a one-way video call, for example, and the multi-way video application 1108 receives data from the network that conditions have improved, for example, then the multi-way video application 1108 can display a prompt to ask the user if an upgrade to two-way video is desired. If the user indicates an upgrade is desirable, then the multi-way video application 1108 can make the appropriate changes. In this configuration, the multi-way video application 1108 can make decisions based on the network data, onboard data, and other factors—i.e., as opposed to simply receiving instructions from the network.

The UE 1100 can also comprise one or more processors 1110. In some implementations, the processor(s) 1110 can be a central processing unit (CPU), a graphics processing unit (GPU), both CPU and GPU, or any other processing unit. The UE 1100 may also include additional data storage devices (removable and/or non-removable) such as, for example, magnetic disks, optical disks, or tape. Such additional storage is illustrated in FIG. 11 by removable storage 1112 and non-removable storage 1114. The removable storage 1112 and non-removable storage 1114 can store some, or all, of the functions 1106, 1108 and/or the OS 1104.

Non-transitory computer-readable media may include volatile and nonvolatile, removable and non-removable tangible, physical media implemented in technology for storage of information, such as computer readable instructions, data structures, program modules, or other data. The memory 1102, removable storage 1112, and non-removable storage 1114 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the UE 1100. Any such non-transitory computer-readable media may be part of the UE 1100 or may be a separate database, databank, remote server, or cloud-based server.

In some implementations, the transceiver(s) 1116 include any transceivers known in the art. In some examples, the transceiver(s) 1116 can include wireless modem(s) to facilitate wireless connectivity with other UE (e.g., between the sender UE 102 and the recipient UE 104), the Internet, and/or an intranet via the cellular network. Further, the transceiver(s) 1116 may include a radio transceiver that performs the function of transmitting and receiving radio frequency communications via an antenna (e.g., Wi-Fi or Bluetooth®). In other examples, the transceiver(s) 1116 may include wired communication components, such as a wired modem or Ethernet port, for communicating with the other UE or the provider's internet-based network. The transceiver(s) 1116 can enable the UE 1100 to send and receive messages and commands associated with the systems 200, 300, 400, 500, 1000; GUIs 600, 700, 800; and methods 900, described above.

In some implementations, the output device(s) 1118 include any output devices known in the art, such as a display (e.g., a liquid crystal or thin-film transistor (TFT) display), a touchscreen display (e.g., for use with the GUIs 600, 700, 800), speakers, a vibrating mechanism, or a tactile feedback mechanism. In some examples, the output devices can play various sounds when sending or receiving video calls. In some examples, the output device(s) 1118 may play a different sound or display a different graphic depending on whether the user is receiving a two-way or one-way video call. The output device(s) 1118 may also play an error tone or display an error message when a video call or a call modification is declined by the recipient. Output device(s) 1118 can also include ports for one or more peripheral devices, such as headphones, peripheral speakers, or a peripheral display.

In various implementations, input device(s) 1120 include any input devices known in the art. For example, the input device(s) 1120 may include a camera, a microphone, or a keyboard/keypad. The input device(s) 1120 can include the touch-sensitive display or a keyboard to enable users to enter data and make and receive calls via the multi-way video application 1108 and other applications 1106. The touch-sensitive display or keyboard/keypad may be a standard push button alphanumeric multi-key keyboard (such as a conventional QWERTY keyboard), virtual controls on a touchscreen (e.g., as shown in the GUIS 600, 700, 800), or one or more other types of keys or buttons, and may also include a joystick, wheel, and/or designated navigation buttons, or the like.

Figure 12:
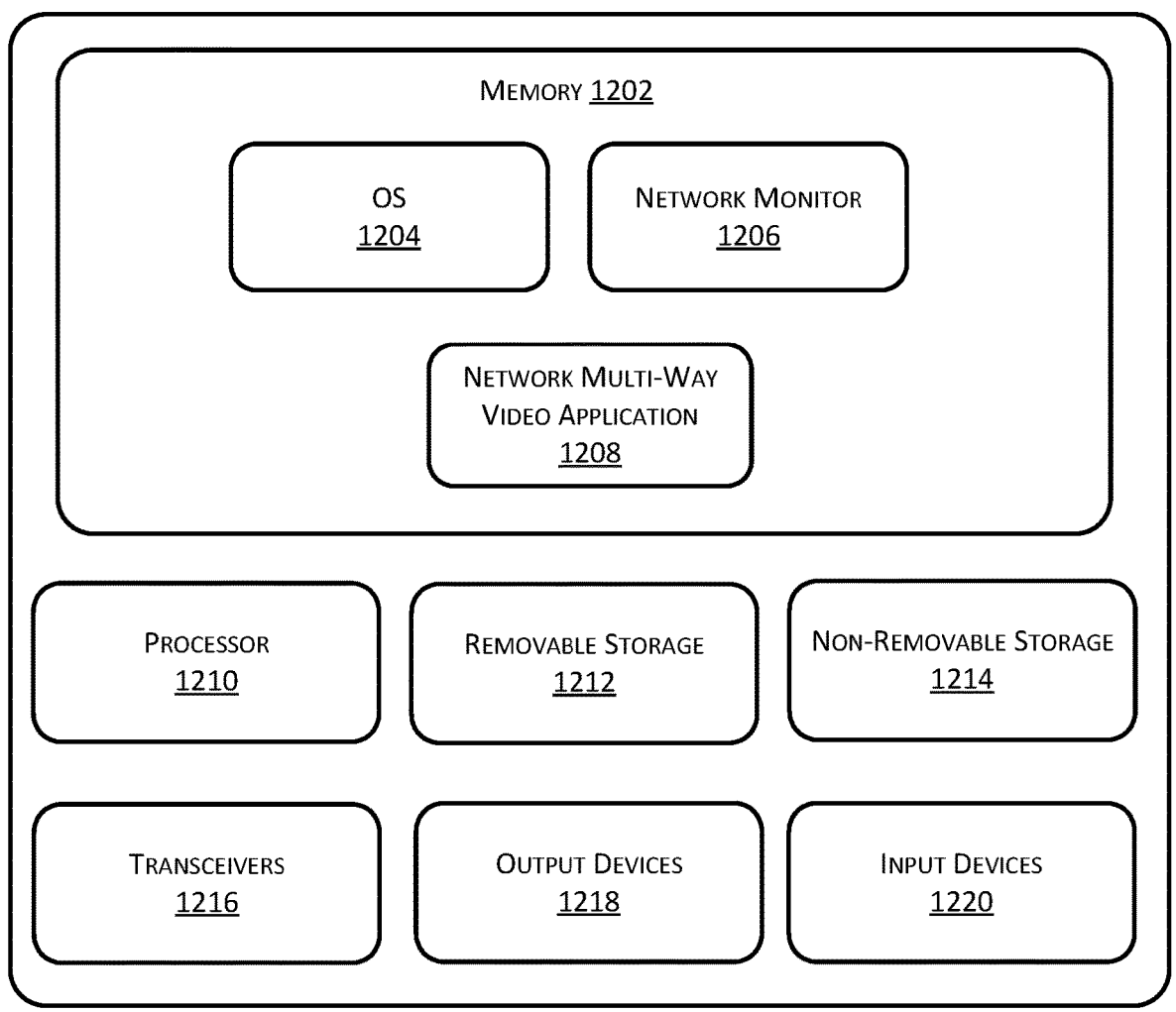
FIG. 12 is an example of a server for use with the systems and methods disclosed herein, in accordance with some examples of the present disclosure.

As shown in FIG. 12, the systems 200, 300, 400, 500, 1000 and methods 900 can also be used in conjunction with a server 1200 (e.g., the call application server 106, HLR/HSS 1014, etc.). To simplify the discussion, the server 1200 is discussed below as a standalone server. One of skill in the art will recognize, however, that the systems 200, 300, 400, 500, 1000 and methods 900 disclosed herein can also be implemented partially, or fully, on a network entity such as, for example, the PCRF 1018, for example, or a 3GPP AAA server, among other things. Thus, the discussion below in terms of the server 1200 is not intended to limit the disclosure to the use of a standalone server.

The server 1200 can be a TAS server (e.g., the call application server 106) capable of providing video and/or audio calling services, including sending, receiving, and modifying video calls, as discussed above. The server 1200 can comprise a number of components to execute part, or all, of the above-mentioned systems 200, 300, 400, 500, 1000 and methods 900. The server 1200 can comprise memory 1202 including, for example, an OS 1204, a network monitor 1206, and a network multi-way video application (NMVA) 1208. In various implementations, the memory 1202 can be volatile (such as RAM), non-volatile (such as ROM, flash memory, etc.), or some combination of the two. The memory 1202 can include all, or part, of the functions 1206, 1208 and the OS 1204 for the server 1200, among other things.

The OS 1204 can vary depending on the manufacturer of the server 1200 and the type of component. Many servers, for example, run Linux or Windows server. Dedicated cellular routing servers may run specific telecommunications OSs. The OS 1204 contains the modules and software that supports a computer's basic functions, such as scheduling tasks, executing applications, and controlling peripherals. The OS 1204 can enable the server 1200 to receive messages and calls and relay the messages and calls to the addressee (e.g., to and from the sender UE 102 and the recipient UE 104). In some examples, as discussed below, the OS 1204 can also enable the server 1200 to perform some, or all, of the systems 200, 300, 400, 500, 1000 and methods 900 discussed herein.

In some examples, the server 1200 can include a network monitor 1206. The network monitor 1206 can comprise an application configured to monitor various network conditions such as, for example, traffic levels, available capacity, delay, and jitter. In other examples, the network monitor 120 can receive various network performance parameters from another network entity (e.g., the I-CSCF 1022), rather than monitoring them directly. In still other examples, the network monitor 1206 can also receive information from the UEs 102, 104 or from one or more wireless base stations (WBSs) related to traffic levels, signal quality, signal strength, etc.

The network monitor 1206 can provide data to the NMVA 1208. The NMVA 1208, in turn, can manage upgrading and downgrading video calls for the UEs 102, 104 or can provide information to the UEs 102, 104 for their use in managing video calls. So, for example, the NMVA 1208 may provide instructions or data to the multi-way video application 1108 to facilitate modifying calls as network conditions change. The NMVA 1208 may receive data from other network entities regarding network traffic levels, for example, determine that network availability has fallen below a predetermined level, and, in response, send instructions to one or more UE to downgrade to one-way video or audio-only calls.

The server 1200 can also comprise one or more processors 1210. In some implementations, the processor(s) 1210 can be a central processing unit (CPU), a graphics processing unit (GPU), both CPU and GPU, or any other processing unit. The server 1200 can also include one or more of removable storage 1212, non-removable storage 1214, transceiver(s) 1216, output device(s) 1218, and input device(s) 1220.

The server 1200 may also include additional data storage devices (removable and/or non-removable) such as, for example, magnetic disks, optical disks, or tape. Such additional storage is illustrated in FIG. 12 by removable storage 1212 and non-removable storage 1214. The removable storage 1212 and non-removable storage 1214 can store some, or all, of the OS 1204 and functions 1206, 1208.

Non-transitory computer-readable media may include volatile and nonvolatile, removable and non-removable tangible, physical media implemented in technology for storage of information, such as computer-readable instructions, data structures, program modules, or other data. The memory 1202, removable storage 1212, and non-removable storage 1214 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server 1200. Any such non-transitory computer-readable media may be part of the server 1200 or may be a separate database, databank, remote server, or cloud-based server.

In some implementations, the transceiver(s) 1216 include any transceivers known in the art. In some examples, the transceiver(s) 1216 can include wireless modem(s) to facilitate wireless connectivity with the UEs 102, 104, the Internet, the cellular network, and/or an intranet via a cellular connection. Further, the transceiver(s) 1216 may include a radio transceiver that performs the function of transmitting and receiving radio frequency communications via an antenna (e.g., Wi-Fi or Bluetooth®) to connect to the IP network 1012. In other examples, the transceiver(s) 1216 may include wired communication components, such as a wired modem or Ethernet port. The transceiver(s) 1216 can enable the server 1200 to communicate with the UEs 102, 104 and to send and receive messages and calls between the UEs 102, 104 and/or other UEs.

In some implementations, the output device(s) 1218 include any output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the server 1200 is connected to a network, when a message is sent or received, when a message is modified, or when a message modification is rejected by an incompatible UE 102, 104, among other things. Output device(s) 1218 also include ports for one or more peripheral devices, such as headphones, peripheral speakers, or a peripheral display.

In various implementations, input device(s) 1220 include any input devices known in the art. For example, the input device(s) 1220 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems and methods above are discussed with reference to use with cellular communications, the systems and methods can be used with other types of wired and wireless communications. In addition, while various functions are discussed as being performed on the UEs 102, 104 and/or on the call application server 106, for example, other components, such as network entities, could perform some, or all, of these functions without departing from the spirit of the invention. In addition, while the disclosure is primarily directed to UEs 102, 104 sending, receiving, and modifying video calls, it can also be used with other types of communications and on other devices (e.g., IP network 1012 devices, M2M, or IoT devices) on the same, or similar, networks or future networks. Indeed, the systems 200, 300, 400, 500, 1000; GUIs 600, 700, 800; and methods 900 described herein can be applied to virtually any network that provides multiple modes of communication.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
    receiving, at a transceiver of a recipient user equipment (UE), a first signal from a sender UE requesting to establish a two-way video call, the first signal comprising a first set of parameters;
    displaying, on a display of the recipient UE, a multi-way video graphical user interface (GUI) including at least a one-way video-in button, a one-way video-out button, or an audio-only button;
    determining, with a processor of the recipient UE, that the two-way video call is to be downgraded; and
    sending, with the transceiver, a second signal with a second set of parameters to the sender UE, the second set of parameters indicating the two-way video call is to be downgraded to one of a one-way video-in call or a one-way video-out call.

2. The method of claim 1, wherein determining that the two-way video call is to be downgraded comprises determining that a camera on the recipient UE is inoperable.

3. The method of claim 1, wherein determining that the two-way video call is to be downgraded comprises determining that a battery on the recipient UE is below a predetermined charge level.

4. The method of claim 1, wherein determining that the two-way video call is to be downgraded comprises receiving, at the GUI, a selection of the one-way video-in button or the one-way video-out button.

5. The method of claim 1, wherein determining that the two-way video call is to be downgraded comprises receiving, at the transceiver, a third signal from a network entity to downgrade the two-way video call.

6. The method of claim 1, further comprising:
receiving, at the transceiver, a third signal from the sender UE acknowledging the second set of parameters; and
sending, by the transceiver, a fourth signal to the sender UE initiating a downgraded call.

7. The method of claim 6, further comprising:
determining, at the processor of the recipient UE, that the downgraded call is to be upgraded to a two-way video call; and
sending, by the transceiver, a fifth signal to the sender UE to upgrade the downgraded call to the two-way video call;
wherein the fifth signal comprises the first set of parameters.

8. A sender UE comprising:
a display including a call initiation graphical user interface (GUI);
a transceiver to send and receive at least one of wired or wireless transmissions;
memory storing computer-executable instructions; and
a processor in communication with at least the transceiver and the memory, the computer-executable instructions causing the processor to:
receive, at the call initiation GUI, a first input including a first contact or a first phone number;
receive, at the call initiation GUI, a second input to initiate a two-way video call to a recipient UE associated with the first contact or first phone number;
send, with the transceiver, a first signal to the recipient UE including a first set of parameters and requesting the two-way video call; and
receive, with the transceiver, a second signal from the recipient UE including a second set of parameters and requesting to downgrade the two-way video call to a first downgraded call;
wherein the second set of parameters indicating the two-way video call is to be downgraded to one of a one-way video-in call or a one-way video-out call.

9. The sender UE of claim 8, the computer-executable instructions further causing the processor to:
present, on the display, a call modification GUI including data associated with the first downgraded call in response to the second signal;
receive, at the call modification GUI, a third input in response to the first downgraded call; and either:
send, with the transceiver, a third signal to the recipient UE, the third signal including an acknowledgement of the first downgraded call and the second set of parameters; or send, with the transceiver, a fourth signal to the recipient UE, the fourth signal including a second downgraded call and a third set of parameters; or
send, with the transceiver, a fifth signal declining the first downgraded call;
wherein the second downgraded call is another of the one-way video-in call, the one-way video-out call, or an audio-only call.

10. The sender UE of claim 9, wherein the second downgraded call comprises the audio-only call; and
wherein the transceiver sends the fifth signal declining the first downgraded call.

11. The sender UE of claim 9, the computer-executable instructions further causing the processor to:
receive, at the call initiation GUI, a third input including a second contact or a second phone number;
receive, at the call initiation GUI, a fourth input to initiate a one-way video call to the recipient UE associated with the second contact or second phone number;
send, with the transceiver, a third signal to the recipient UE including a third set of parameters and requesting the one-way video call; and
receive, with the transceiver, a fourth signal from the recipient UE acknowledging the third set of parameters and initiating the one-way video call.

12. The sender UE of claim 11, wherein the one-way video call is a one-way video-in call comprising video from the recipient UE to the sender UE only.

13. The sender UE of claim 11, wherein the one-way video call is a one-way video-out call comprising video from the sender UE to the recipient UE only.

14. A recipient user equipment (UE) comprising:
a display including a call modification graphical user interface (GUI);
a transceiver to send and receive at least one of wired or wireless transmissions;
memory storing computer-executable instructions; and
a processor in communication with at least the transceiver and the memory, the computer-executable instructions causing the processor to:
receive, with the transceiver, a first signal from a sender UE requesting a two-way video call;
display, on the call modification GUI, data associated with the two-way video call and a first set of inputs associated with two-way video calls;
receive, at the call modification GUI, a first input from the first set of inputs in response to the two-way video call; and
send, with the transceiver, a second signal requesting to down-grade the two-way video call to a one-way video call in response to the first input, the second signal including a set of parameters indicating the one-way video call is to be one of a one-way video-in call or a one-way video-out call.

15. The recipient UE of claim 14, wherein the set of parameters indicate the one-way video call is to be a one-way video-in call.

16. The recipient UE of claim 15, the computer-executable instructions further causing the processor to:
receive, with the transceiver, a third signal from the sender UE requesting to further downgrade to an audio-only call; and
display, on the call modification GUI, updated data associated with the audio-only call and a second set of inputs associated with audio-only calls.

17. The recipient UE of claim 16, the computer-executable instructions further causing the processor to:

receive, via the call modification GUI, a second input from the second set of inputs in response to the audio-only call; and either:

send, with the transceiver, a fourth signal to the recipient UE acknowledging the audio-only call in response to the second input; or send, with the transceiver, a fifth signal to decline the audio-only call in response to the second input.

18. The recipient UE of claim 14, wherein the set of parameters indicate the one-way video call is to be a one-way video-out call.

19. The recipient UE of claim 14, the computer-executable instructions further causing the processor to:

receive, with the transceiver, a third signal from another sender UE requesting another two-way video call;

display, on the call modification GUI, data associated with the other two-way video call and the first set of inputs associated with two-way video calls;

receive, at the call modification GUI, a second input from the first set of inputs in response to the other two-way video call; and send, with the transceiver, a fourth signal to the other sender UE acknowledging the other two-way video call in response to the second input.

20. The recipient UE of claim 14, the computer-executable instructions further causing the processor to:

receive, with the transceiver, a third signal from the sender UE declining the downgraded one-way video call.

\* \* \* \* \*